(12) United States Patent
Yang et al.

(10) Patent No.: US 12,189,734 B2
(45) Date of Patent: Jan. 7, 2025

(54) SECURITY CONTROL METHOD AND SYSTEM

(71) Applicant: YUNDING NETWORK TECHNOLOGY (BEIJING) CO., LTD., Beijing (CN)

(72) Inventors: Yushan Yang, Beijing (CN); Weiliang Chen, Beijing (CN); Jian Long, Shenzhen (CN); Tao Li, Beijing (CN); Dasheng Liu, Shenzhen (CN); Qi Yi, Shenzhen (CN); Haibo Yu, Shenzhen (CN)

(73) Assignee: YUNDING NETWORK TECHNOLOGY (BEIJING) CO., LTD., Beijing (CN)

( * ) Notice: Subject to any disclaimer, the term of this patent is extended or adjusted under 35 U.S.C. 154(b) by 762 days.

(21) Appl. No.: 17/244,980

(22) Filed: Apr. 30, 2021

(65) Prior Publication Data

US 2021/0248221 A1 Aug. 12, 2021

Related U.S. Application Data

(63) Continuation of application No. PCT/CN2019/114912, filed on Oct. 31, 2019.

(30) Foreign Application Priority Data

Oct. 31, 2018 (CN) .......................... 201811283410.6
Oct. 31, 2018 (CN) .......................... 201811283419.7
(Continued)

(51) Int. Cl.
*G06V 40/16* (2022.01)
*G06F 21/32* (2013.01)
*G07C 9/23* (2020.01)

(52) U.S. Cl.
CPC ............ *G06F 21/32* (2013.01); *G06V 40/166* (2022.01); *G06V 40/169* (2022.01); *G07C 9/23* (2020.01)

(58) Field of Classification Search
CPC ....... G06F 21/32; G06F 21/34; G06V 40/166; G06V 40/169; G07C 9/23; G08B 29/188; G08B 3/10; G08B 13/19619; H04N 7/18
See application file for complete search history.

(56) References Cited

U.S. PATENT DOCUMENTS 8,408,736 B2 4/2013 Chien
2013/0057695 A1 3/2013 Huisking
(Continued)

FOREIGN PATENT DOCUMENTS

CN 203301634 U 11/2013
CN 104183044 A 12/2014
(Continued)

OTHER PUBLICATIONS

International Search Report in PCT/CN2019/114912 mailed on Feb. 3, 2020, 8 pages.
(Continued)

*Primary Examiner* — Wesley J Tucker
*Assistant Examiner* — Han Hoang
(74) *Attorney, Agent, or Firm* — METIS IP LLC

(57) ABSTRACT

The present disclosure relates to security control methods and systems. The security control system may include at least one storage device storing a set of instructions; and one or more processors in communication with the at least one storage device, wherein when executing the set of instructions, the one or more processors are configured to direct the system to: obtain first data from a first device; obtain second data from a second device; associate and process the first data and/or the second data; and send the processed first data
(Continued)

and second data to a server and/or a user terminal. The present disclosure can achieve linkage control of a plurality of access controls to meet the needs of users on indoor security.

20 Claims, 17 Drawing Sheets

(30) Foreign Application Priority Data

Nov. 30, 2018 (CN) .......................... 201811453466.1
Nov. 30, 2018 (CN) .......................... 201822007074.4

(56) References Cited

U.S. PATENT DOCUMENTS

| | | | |
|---|---|---|---|
| 2016/0358433 A1 | 12/2016 | Johnson | |
| 2017/0200356 A1* | 7/2017 | Kim | H04N 7/183 |
| 2017/0208362 A1 | 7/2017 | Flores et al. | |
| 2018/0181797 A1* | 6/2018 | Han | G06V 10/764 |
| 2018/0220108 A1* | 8/2018 | Siminoff | G08B 13/1966 |
| 2020/0014552 A1* | 1/2020 | Tan | H04L 12/2809 |

FOREIGN PATENT DOCUMENTS

| | | |
|---|---|---|
| CN | 105139500 A | 12/2015 |
| CN | 205314704 U | 6/2016 |
| CN | 205490915 U | 8/2016 |
| CN | 107195036 A | 9/2017 |
| CN | 107590895 A | 1/2018 |
| CN | 107613254 A | 1/2018 |
| CN | 108198287 A | 6/2018 |
| CN | 108198303 A | 6/2018 |
| CN | 108615288 A | 10/2018 |
| CN | 109525813 A | 3/2019 |
| CN | 208905106 U | 5/2019 |
| KR | 20140038076 A | 3/2014 |

OTHER PUBLICATIONS

Written Opinion in PCT/CN2019/114912 mailed on Feb. 3, 2020, 14 pages.
First Office Action in Chinese Application No. 201811453466.1 mailed on Jan. 13, 2020, 21 pages.
The Second Office Action in Chinese Application No. 201811453466.1 mailed on Jun. 5, 2020, 20 pages.
Zhou, Hong et al., Anti-theft and Multiple Automatic Alarm System, Intelligent Home Control System, 2006, 2 pages.
Yang, Xun et al., Home Security, Introduction to Internet of Things Technology, 2015, 6 pages.
First Office Action in Chinese Application No. 201811283410.6 mailed on Apr. 29, 2023, 15 pages.

* cited by examiner

SECURITY CONTROL METHOD AND SYSTEM

CROSS-REFERENCE TO RELATED APPLICATIONS

This application is a continuation of International Application No. PCT/CN2019/114912, filed on Oct. 31, 2019, which claims priority to Chinese Application No. 201811283419.7, filed on Oct. 31, 2018, Chinese Application No. 201811283410.6, filed on Oct. 31, 2018, Chinese Application No. 201811453466.1, filed on Nov. 30, 2018, and Chinese Application No. 201822007074.4, filed on Nov. 30, 2018, the contents of each of which are hereby incorporated by reference.

TECHNICAL FIELD

The present disclosure relates to the field of security control technology, and in particularly, to security control methods and systems based on Internet technology.

BACKGROUND

With the advancement of science and technology, people have a growing demand for indoor security, for example, the need for indoor security control. Most of the existing security devices can achieve a plurality of security functions independently, such as video surveillance, authentication of access switch, abnormity alarming, etc. Therefore, it is desirable to provide security control methods and systems that associate various functions of the access control system to meet the needs of users on indoor security.

SUMMARY

One of the embodiments of the present disclosure provides a security control system. The security control system may include: at least one storage device storing a set of instructions; and one or more processors in communication with the at least one storage device, wherein when executing the set of instructions, the one or more processors are configured to direct the system to: obtain first data from a first device; obtain second data from a second device; and associate and process the first data and/or the second data.

One of the embodiments of the present disclosure provides a security control method. The security control method may include obtaining first data from a first device; obtaining second data from a second device; and associating and processing the first data and/or the second data.

One of the present disclosure embodiments provides a computer readable storage medium. The storage medium may store computer instructions. When executed by one or more processors of the system, the instructions may direct the system to: obtain first data from a first device; obtain second data from a second device; and associate and process the first data and/or the second data.

One of the present disclosure embodiments provides a data association method. The data association method may be applied to a server. The method may include: obtaining door lock data uploaded by a smart door lock and peephole viewer data uploaded by a smart peephole viewer associated with a same user identifier; determining door lock data and peephole viewer data associated with a same unlocking operation; and associating the door lock data and the peephole viewer data associated with the same unlocking operation to obtain associated data.

In some embodiments, the determining door lock data and peephole viewer data associated with a same unlocking operation may include: determining that the door lock data and the peephole viewer data including the same association identifier is associated with the same unlocking operation when the door lock data or the peephole viewer data includes the association identifier. The association identifier may be configured to characterize that the door lock data or the peephole viewer data has peephole viewer data or door lock data associated with the same unlocking operation.

In some embodiments, the determining door lock data and peephole viewer data associated with a same unlocking operation may include: obtaining an unlocking time corresponding to the door lock data; and checking whether there is peephole viewer data that a videoing time period includes the unlocking time according to the unlocking time; in response to a determination that there is peephole viewer data that including a videoing time period includes the unlocking time, determining that the peephole viewer data and the peephole viewer data is associated with the same unlocking operation.

In some embodiments, the method may further include: determining whether the door opening scene is safe according to the associated data; and in response to a determination that the door opening scene is not safe, sending the associated data to the user terminal.

One of the present disclosure embodiments provides a data association method. The data association method may be applied to a smart peephole viewer. The method may include: receiving a video trigger instruction sent by a smart door lock associated with the smart peephole viewer, wherein the video trigger instruction is generated after the smart door lock detects an unlocking operation, and the video trigger instruction carries an association identifier of door lock data that is generated after the smart door lock detects the unlocking operation; recording video data of an outside environment according to the video trigger instruction, and marking the association identifier associated with the door lock data in the video data to obtain peephole viewer data; and uploading the peephole viewer data to a server to facilitate the server to determine, according to the association identifier, the door lock data and the peephole viewer data associated with the unlocking operation and associate the door lock data and the peephole viewer data.

In some embodiments, the method may further include: recording video data of an outside environment to obtain peephole viewer data when the smart peephole viewer senses there is an abnormal condition outside the door; and sending the association identifier of the peephole viewer data to the smart door lock to facilitate the smart door lock to generate door lock data carrying the association identifier when the smart door lock receives the association identifier of the peephole viewer data and detects that there is currently an unlocking operation.

One of the present disclosure embodiments provides a data association method. The data association method may be applied to a smart door lock. The method may include: generating door lock data after detecting an unlocking operation, and sending a video trigger instruction to a smart peephole viewer associated with the smart door lock, wherein the video trigger instruction is configured to trigger the smart peephole viewer to take videos or photos of outside environment, and carries an association identifier of the door lock data; and uploading the door lock data to a server to facilitate the server to determine, according to the association identifier of the door lock data, the door lock data and the peephole viewer data associated with the unlocking operation and associate the door lock data and the peephole viewer data.

One of the present disclosure embodiments provides a data association device. The data association device may be applied to a server. The device may include: an obtaining module configured to obtain door lock data uploaded by a smart door lock and peephole viewer data uploaded by a smart peephole viewer, the smart door lock and the smart peephole viewer being associated with a same user identifier; a determination module configured to determine door lock data and peephole viewer data associated with a same unlocking operation; and an association module configured to associate the door lock data and the peephole viewer data associated with the same unlocking operation to obtain associated data.

One of the present disclosure embodiments provides a data association device. The data association device may be applied to a smart peephole viewer. The device may include: a receiving module configured to receive a video trigger instruction sent by a smart door lock associated with the smart peephole viewer, wherein the video trigger instruction is generated after the smart door lock detects an unlocking operation, and the video trigger instruction carries an association identifier of door lock data that is generated after the smart door lock detects the unlocking operation; a marking module configured to record video data of an outside environment according to the video trigger instruction, and mark the association identifier associated with the door lock data in the video data to obtain peephole viewer data; and an uploading module configured to upload the peephole viewer data to a server to facilitate the server to determine, according to the association identifier, the door lock data and the peephole viewer data associated with the unlocking operation and associate the door lock data and the peephole viewer data.

One of the present disclosure embodiments provides a data association device. The data association device may be applied to a smart door lock. The device may include: an instruction sending module configured to generate door lock data after detecting an unlocking operation, and send a video trigger instruction to a smart peephole viewer associated with the smart door lock, wherein the video trigger instruction is configured to trigger the smart peephole viewer to take videos or photos of outside environment, and carries an association identifier of the door lock data; and an uploading module configured to upload the door lock data to a server to facilitate the server to determine, according to the association identifier of the door lock data, the door lock data and the peephole viewer data associated with the unlocking operation and associate the door lock data and the peephole viewer data.

One of the present disclosure embodiments provides method for marking a user identity attribute of data applied to a server. The method may include: obtaining door lock data and peephole viewer data associated with a same user identifier, wherein the door lock data carries an identity attribute of an unlocker; determining door lock data and peephole viewer data associated with a same unlocking operation; recognizing a face image included in the peephole viewer data using a face recognition algorithm; and obtaining a marked face image by establishing an association relationship between the user identity carried by the door lock data associated with the same unlocking operation and the face image included in the peephole viewer data.

In some embodiments, the determining door lock data and peephole viewer data associated with a same unlocking operation may include: determining that door lock data and peephole viewer data including a same association identifier is associated with the same unlocking operation when the door lock data or the peephole viewer data includes an association identifier. The association identifier may be configured to characterize that the door lock data or the peephole viewer data has peephole viewer data or door lock data associated with the same unlocking operation.

In some embodiments, the peephole viewer data may carry the association identifier, and the peephole viewer data may be data collected by the smart peephole viewer after receiving the video trigger instruction generated by the associated smart door lock and including the associated identifier. The video trigger instruction may be generated after the smart door lock detects an unlocking operation. The door lock data may carry the association identifier. The door lock data may be generated when the smart door lock receives the association identifier sent by the associated smart peephole viewer and detects that there is currently an unlocking operation.

In some embodiments, the determining door lock data and peephole viewer data associated with a same unlocking operation: obtaining an unlocking time corresponding to the door lock data; and checking whether there is peephole viewer data that a videoing time period includes the unlocking time according to the unlocking time; in response to a determination that there is peephole viewer data that the videoing time period includes the unlocking time, determining that the peephole viewer data and the door lock data is associated with the same unlocking operation.

In some embodiments, the method may further include: storing the marked face image into a face image library. The face image library may be configured to store a face image that has been marked.

In some embodiments, the method may further include: receiving the peephole viewer data of the scene outside the door collected by the smart peephole viewer, and recognizing a face image included in the peephole viewer data using a face recognition algorithm; and determining whether there is a marked face image that matches the face image in the face image library; in response to a determination that there is a matching marked face image in the face image library, determining that the identity of the person outside the door is the user identity of the marked face image; or in response to a determination that there is no matching marked image in the face image library, determining that the person outside the door is a stranger.

In some embodiments, the method may further include: sending reminder information and the person's face image to a user terminal in response to the determination that the person outside the door is a stranger. The reminder information may be configured to remind the user that the person outside the door is not a legal user.

One of the data of the present disclosure provides a method for marking a user identity attribute of data applied to a server. The method may include receiving peephole viewer data sent by a smart peephole viewer, wherein the peephole viewer data carries an identity attribute of an unlocker, and the peephole viewer data is generated after the smart peephole viewer receives a video trigger instruction that is sent by an associated smart door lock and carries the identity attribute of the unlocker; recognizing a face image included in the peephole viewer data; and obtaining a marked face image by establishing an association relationship between the identity attribute of the unlocker and the face image.

One of the present disclosure embodiments provides a device for marking a user identity attribute of data applied to a server. The device may include: an obtaining module configured to obtain door lock data and peephole viewer data associated with a same user identifier, wherein the door lock data carries an identity attribute of an unlocker; a determination module configured to determine door lock data and peephole viewer data associated with a same unlocking operation; a face recognition module configured to recognize a face image included in the peephole viewer data using a face recognition algorithm; and an identity marking module configured to obtain a marked face image by establishing an association relationship between the user identity carried by the door lock data associated with the same unlocking operation and the face image included in the peephole viewer data.

One of the present disclosure embodiments provides a device for marking a user identity attribute of data applied to a server. The device may include: a receiving module configured to receive peephole viewer data sent by a smart peephole viewer, wherein the peephole viewer data carries an identity attribute of an unlocker, and the peephole viewer data is generated after the smart peephole viewer receives a video trigger instruction that is sent by an associated smart door lock and carries the identity attribute of the unlocker; a recognition module configured to recognize a face image included in the peephole viewer data; and an identity marking module configured to obtain a marked face image by establishing an association relationship between the identity attribute of the unlocker and the face image.

One of the present disclosure embodiments provides a monitoring system including: a monitoring device including a slave machine installed outside a door and a master machine installed inside the door, the master machine being communicatively connected with the slave machine. The slave machine may include a passive infrared sensor (PIR) and a camera and the master machine may include a controller, at least one infrared ranging sensor and a display screen. The controller may be communicatively connected with the PIR, the camera, the infrared ranging sensor, and the display screen, respectively.

In some embodiments, the monitoring system may further include a server. The monitoring device may be wirelessly connected with the server.

In some embodiments, an alarm button may be provided on the master machine. The alarm button may be communicatively connected with the controller. The monitoring device may send alarm information to the server when the alarm button is triggered.

In some embodiments, the master machine may be communicatively connected with the slave machine wirelessly.

In some embodiments, the master machine may include two infrared ranging sensors, respectively arranged on the left and right sides of the display screen in front of the master machine.

In some embodiments, the infrared ranging sensor may be an integrated infrared ranging sensor or a split infrared ranging sensor.

In some embodiments, white light lamps may be disposed on both sides of the camera. An infrared lamp may be disposed above the camera. A photosensitive sensor may be disposed below the camera. The white light lamps, the infrared lamp and the photosensitive sensor may be communicatively connected with the controller, respectively.

In some embodiments, the master machine may be provided with a wake-up button of the display screen.

In some embodiments, the display screen may be a touch screen, and the wake-up button of the display screen may be provided on the display screen.

In some embodiments, the display screen may be a touch screen, and the alarm button may be provided on the display screen.

One of the present disclosure embodiments provides a method for screen controlling of a monitoring device applied to a monitoring device. The method may include: in response to a determination that a passive infrared sensor (PIR) is triggered, turning on a camera installed outside a door for videoing; determining whether there is any person within a preset range inside the door; in response to a determination that there is a person and a display screen of the monitoring device is turned off, turning on the display screen, and displaying real-time videos collected by the camera, wherein the display screen is in a screen-on state after being turned on; or in response to a determination that there is no person, refraining from turning on the display screen when the display screen of the monitoring device is turned off, and turning off the display screen when the display screen is in a screen-on state.

In some embodiments, the method may further include: timing a screen-on duration of the display screen when the display screen is turned on; and turning off the display screen when the display screen is in a screen-on state and the screen-on duration meets a preset condition, the shortest screen-on duration being a preset duration.

In some embodiments, the turning off the display screen when the display screen is in a screen-on state and the screen-on duration meets a preset condition may include: determining whether the PIR is triggered again within the preset duration when the display screen is in a screen-on state; in response to a determination that the PIR is not triggered again, determining whether the screen-on duration of the current display screen reaches the preset duration; in response to a determination that the screen-on duration of the current display screen reaches the preset duration, turning off the display screen; or in response to a determination that the screen-on duration of the current display screen does not reach the preset duration, determining whether the PIR is triggered again within the preset duration when the display screen is in a screen-on state; or in response to a determination that the PIR is triggered again, adjusting an upper limit of the screen-on duration of the display screen according to the screen-on duration when the PIR is triggered again, and turning off the display screen when the screen-on duration of the display screen reaches the upper limit of the screen-on duration of the display screen.

In some embodiments, the adjusting an upper limit of the screen-on duration of the display screen according to the screen-on duration when the PIR is triggered again, and turning off the display screen when the screen-on duration of the display screen reaches the upper limit of the screen-on duration of the display screen may include: determining whether a sum of the screen-on duration when the PIR is triggered again and a preset delayable duration is greater than a preset duration; in response to a determination that the sum of the screen-on duration when the PIR is triggered again and the preset delayable duration is smaller than or equal to a preset duration, determining whether the PIR is triggered again within the preset duration when the display screen is in a screen-on state; or in response to a determination that the sum of the screen-on duration when the PIR is triggered again and the preset delayable duration is greater than a preset duration, designating the sum of the screen-on duration when the PIR is triggered again and the preset delayable duration as the upper limit of the screen-on duration of the display screen, and determining whether the upper limit of the screen-on duration of the display screen is greater than a preset longest screen-on duration; in response to a determination that the upper limit of the screen-on duration of the display screen is greater than the preset longest screen-on duration, designating the preset longest screen-on duration as the upper limit of the screen-on duration of the display screen, and turning off the display screen when the screen-on duration of the display screen reaches the upper limit of the screen-on duration of the display screen; or in response to a determination that the upper limit of the screen-on duration of the display screen is smaller than or equal to the preset longest screen-on duration, determining whether the PIR is triggered again within the upper limit of the screen-on duration of the display screen; in response to a determination that the PIR is not triggered again, turning off the display screen when the screen-on duration of the display screen reaches the upper limit of the screen-on duration of the display screen; or in response to a determination that the PIR is triggered again, designating the sum of the screen-on duration when the PIR is triggered again and the preset delayable duration as the upper limit of the screen-on duration of the display screen.

In some embodiments, the method may further include sending an alarm request to the server when detecting an alarm button on the monitoring device is triggered, to facilitate the server to send alarm information to a preset user terminal.

In some embodiments, the method may further include: sending real-time videos collected by the camera to a server to facilitate the server to determine whether there is an abnormal condition according to the contents of the real-time videos collected by the camera, and if there is an abnormal condition, sending alarm information to the preset user terminal.

In some embodiments, the method may further include: receiving an information obtaining request from the preset user terminal through the server; and sending the real-time videos collected by the camera to the preset user terminal through the server.

In some embodiments, the method may further include: receiving a video call request sent by the preset user terminal through the server; and establishing a video call with the preset user terminal through the server.

BRIEF DESCRIPTION OF THE DRAWINGS

The present disclosure is further illustrated in terms of exemplary embodiments. These exemplary embodiments are described in detail with reference to the drawings. These embodiments are non-limiting schematic embodiments, in which like reference numerals represent similar structures throughout the several views of the drawings, and wherein.

DETAILED DESCRIPTION

Figure 1:
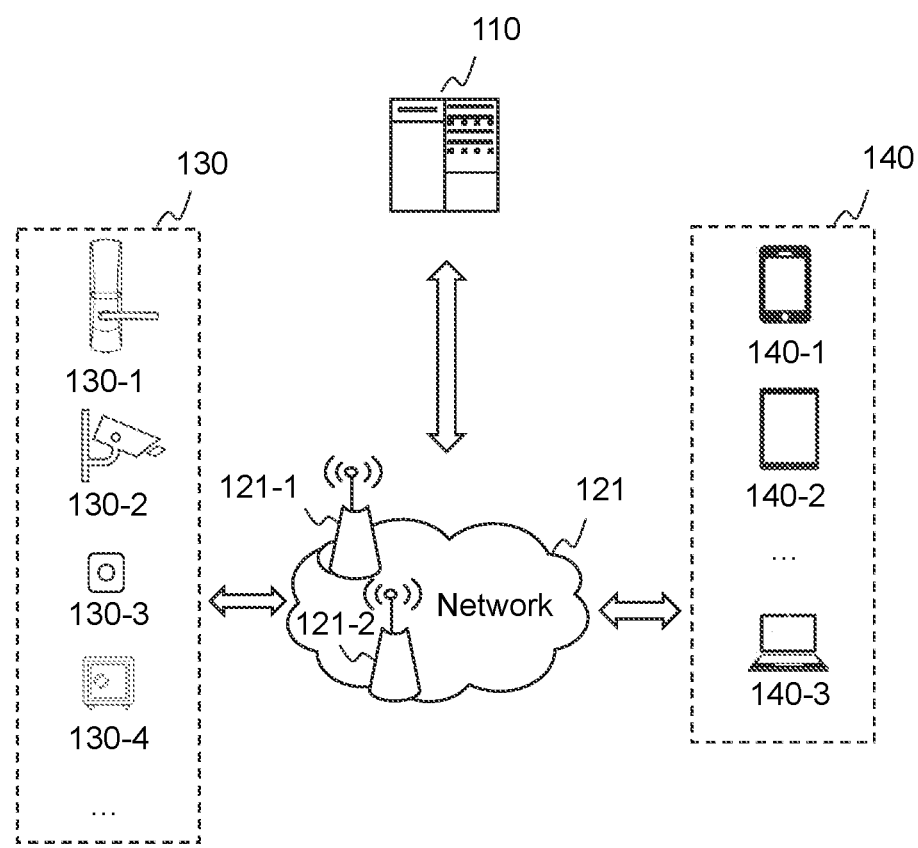
FIG. 1 is a schematic diagram illustrating an application scenario of a security control system according to some embodiments of the present disclosure.

In order to more clearly illustrate the technical solutions related to the embodiments of the present disclosure, brief introduction of the drawings referred to the description of the embodiments is provided below. Obviously, drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system," "device," "unit," and/or "module" used herein are one method to distinguish different components, elements, parts, sections or assemblies of different levels. However, if other words can achieve the same purpose, the words can be replaced by other expressions.

As used in the disclosure and the appended claims, the singular forms "a," "an," and "the" include plural referents unless the content clearly dictates otherwise. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements.

The flowcharts used in the present disclosure illustrate operations that the system implements according to the embodiment of the present disclosure. It should be understood that the foregoing or following operations may not necessarily performed exactly in order. Instead, the operations may be processed in reverse order or simultaneously. Besides, one or more other operations may be added to these processes, or one or more operations may be removed from these processes.

FIG. 1 is a schematic diagram illustrating an application scenario of a security control system according to some embodiments of the present disclosure.

The security control system provided by some embodiments of the present disclosure may perform linkage control of security device(s). The security device(s) may include a security device in public areas, such as factories, office buildings, schools, hospitals, residential communities, etc., or a security device in private areas, such as residential houses, garages, safe boxes, lockers (e.g., safes, gun safes, a lockbox (e.g., a portable safe), a delivery box, a pad lock), etc. In some embodiments, the security device(s) may include security apparatuses with different functions, such as monitoring devices, security switch devices, various sensing units (or sensors), alarm devices, or the like. A security control system 100 may perform linkage control on a plurality of security apparatuses of the security device 130. Merely by way of example, the system 100 may obtain data of each security apparatus for associating and processing the data. As another example, the system 100 may control another portion of security apparatuses based on the input data of a certain portion of the security apparatuses to achieve linkage control. Specifically, the security device 130 may include a first device (e.g., a monitoring device such as a smart peephole viewer, a camera, a visual camera device, a visual doorbell, a doorbell, an outdoor camera, an indoor camera, an audio collection device, etc.), a second device (e.g., a security switch device such as a smart lock, an access switch device, etc.), and various sensing units (e.g., a pyroelectric infrared sensor, an infrared ranging sensor, a pressure sensor, etc.). The smart lock may be applied to access management equipment (e.g., a door lock, a garage lock, an access switch device, etc.), a safe box, lockers (e.g., safes, gun safes, a lockbox (e.g., a portable safe), a delivery box, a pad lock), etc. As shown in FIG. 1, the security control system 100 may at least include a server 110, a network 120, a security device 130, and a user terminal 140.

The server 110 may process data and/or information related to the security device 130 for performing one or more functions described in the present disclosure. In some embodiments, the server 110 may include one or more processors for processing the related data and/or information. For example, the server 110 may obtain the data and/or information of the first device (e.g., a monitoring device such as a smart peephole viewer, a camera, a visual camera device, a visual doorbell, a doorbell, an outdoor camera, an indoor camera, an audio collection device, etc.) and the second device (e.g., a security switch device such as a smart lock, an access switch device, etc.) in the security device 130, and the server may associate and process the data and/or information of the first device and/or the second device and send the data and/or information to the user terminal 140, so that a user of the security device 130 may promptly know the real-time situation of the scene where the security device 130 is located. As another example, the server 110 may obtain monitoring data from the security device 130, and send warning information to the user terminal 140 through the network 120 when recognizing the monitoring data is abnormal. As another example, the server 110 may send data from the security device 130 to the user terminal 140 based on data requests of the user terminal 140. As yet another example, the server 110 may control the security device 130 based on the control instruction of the user terminal 140. In some embodiments, the server 110 may be a single server or a server group. The server group may be a centralized or distributed (e.g., the server 110 may be a distributed system). In some embodiments, the server 110 may be local or remote. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device. In some embodiments, the server 110 may be implemented on a mobile device.

The network 120 may be used for the exchange of information and/or data. One or more components (e.g., the server 110, the security device 130, and the user terminal 140) of the system may send information/data to other components through the network 120. In some embodiments, the network 120 may be any of wired or wireless networks, or a combination thereof. For example, the network 120 may include a cable network, a wired network, a fiber-optic network, a telecommunication network, an intranet, the Internet, a local region network (LAN), a wide region network (WAN), a wireless local region network (WLAN), a metropolitan region network (MAN), a public telephone switched network (PSTN), a general package radio service (GPRS), a mobile phone network, a Bluetooth Network, a ZigBee Network, a near field communication (NFC) Network, a narrow band Internet of things (NB-IoT/LoRa), or the like, or any combination thereof. In some embodiments, the network 120 may include one or more network access points. For example, the network 120 may include wired or wireless network access points, such as base stations and/or Internet exchange points 120-1, 120-2, etc., through which one or more components of the system 100 may be connected to the network 120 to exchange data and/or information.

The security device 130 may include a plurality of security apparatuses. The security device 130 may correspond to a predetermined user terminal 140. In some embodiments, the plurality of security apparatuses in the security device 130 may include a first device (e.g., a monitoring device such as a smart peephole viewer, a camera, a visual camera device, a visual doorbell, a doorbell, an outdoor camera, an indoor camera, an audio collection device, etc.), a second device (e.g., a security switch device such as a smart lock, an access switch device, etc.), a first sensing unit (e.g., a sensor such as a pyroelectric infrared sensor, an infrared ranging sensor, a pressure sensor, etc.), a second sensing unit (e.g., a sensor such as an infrared ranging sensor, a pyroelectric infrared sensor, a pressure sensor, etc.), or the like. The smart lock may be applied to access management device(s) (e.g., a door lock, a garage lock, an access control, etc.), a safe box, a locker, etc. In some embodiments, the first device and the second device may be integrated into a single device (e.g., a smart lock with a camera and/or a biometric module, a safe with a camera and/or a biometric module). In some embodiments, the plurality of security apparatuses may be controlled in linkage. For example, when a smart lock (e.g., of a door) (also referred to as a smart door lock) detects an unlock operation, the smart door lock may send a video trigger instruction to the monitoring device (e.g., the smart peephole viewer). The video trigger instruction may include association identifiers (e.g., door lock identifiers). As another example, when detecting outside abnormal operations (e.g., a plurality of unlocking errors, destroying, shaking, etc.), the monitoring device (e.g., the smart peephole viewer) may start to record video data. The monitoring device (e.g., the smart peephole viewer) may send information such as video data, association identifiers of the video data (e.g., peephole viewer identifiers), and abnormal operation information to the smart door lock. In some embodiments, the video data may be integrated with the abnormal operation information or the like to obtain event information. In some embodiments, the plurality of security apparatuses in the security device 130 may include a display unit associated therewith, for example, a display screen. In some embodiments, the display unit may include a display unit of smart equipment associated with the first device, such as a smart screen, a smart speaker with a screen. In some embodiments, the display unit may be installed or movably placed in the room where it is convenient for users to watch. In some embodiments, each security apparatus may have an independent processor, and the independent processors of security apparatuses may exchange data through a network to realize the linkage control. In some embodiments, the security apparatuses may share a unified processor for processing data and/or information from each security apparatus. For example, the first device outside the door (e.g., a monitoring device such as a smart peephole viewer, a camera, a visual camera device, a visual doorbell, a doorbell, an outdoor camera, an indoor camera, an audio collection device, etc.) may obtain monitoring data, and send the monitoring data to the unified processor. The unified processor may analyze the monitoring data, and determine whether the monitoring data changes within a preset time period (e.g., 0.5 minutes, 1 minute, 2 minutes, 3 minutes, etc.), and may send the monitoring data corresponding to the preset time periods (e.g., 0.5 minutes, 1 minute, 2 minutes, 3 minutes, etc.) before and/or after the change appears to the display screen to confirm the specific situation outside the door. The display screen may be set in any position indoor, such as a door, a bedroom, a study room, a dining room, a living room, etc. As another example, when the pyroelectric infrared sensor outside the door detects a person outside the door, a detection signal may be sent to the unified processor. When the infrared ranging sensor inside the door detects a person within a preset distance range inside the door, a detection signal may be sent to the unified processor. When the unified processor determines that there is a person outside the door and a person inside the door after receiving the detection signals of the pyroelectric infrared sensor outside the door and the infrared ranging sensor inside the door, a signal may be sent to the display screen to control the display screen to be turned on to display the scene outside the door. The display screen may be set in any position, such as, an interior door, a bedroom, a study room, a dining room, a living room, etc. As another example, the first security device may collect monitoring data and send the monitoring data to the unified processor. After the unified processor analyzes the monitoring data, if an abnormality is found, an alarm device may be controlled to give an alarm, and the abnormality may be reported to the server 110 or alarm information may be sent to the user terminal 140. After the user terminal 140 receives the alarm information, a video call may be initiated to the security device 130 through the server 110 or a remote video call with the indoor user may be initiated to confirm the specific situation, and then corresponding measures may be taken.

The user terminal 140 may include but is not limited to, a desktop computer, a laptop computer, a smartphone, a personal digital assistance (PDA), a tablet computer, a handheld game console, smart glasses, a smart watch, a wearable device, a virtual display device, a display enhancement device, or the like, or any combination thereof. The user terminal 140 may include one or more user terminals. The user terminal 140 may be associated with a user or a manager of the security device 130. The plurality of user terminals 140 may communicate with a server 110, and the plurality of user terminals 140 may also exchange data with other devices in the security control system 100 through the network. In some embodiments, the user terminal 140 may be a terminal device of a user of the security device, and may communicate with the security device 130 directly or indirectly (e.g., through a server). For example, after the user terminal 140 receives the alarm information, it may initiate a video call to the security device 130 or make a remote video call with an indoor user to confirm the specific situation.

In some embodiments, the server 110, the security device 130, and the user terminal 140 may be provided with storage devices separately. An independent storage device may be provided in the security control system 100 for storing data and/or instructions. For example, the server 110 may have an integrated storage device, or an independently set storage device (such as a big data server), in which case the server 110 may access the storage device through the network 120. In some embodiments, the storage device may include a mass storage device, a removable storage device, a volatile read-and-write memory, a random-access memory, a read-only memory (ROM), or any combination thereof. Exemplary mass storage device may include a magnetic disk, an optical disk, a solid-status drive, etc. Exemplary removable storage device may include a flash disk, a floppy disk, an optical disk, a memory card, a zip disk, a magnetic tape, or the like. Exemplary volatile read-only memory may include a random memory (RAM). Exemplary RAM may include a dynamic RAM (DRAM), a double data rate synchronous dynamic RAM (DDR SDRAM), a static RAM (SRAM), a thyristor RAM (T-RAM), and a zero capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device may also be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

Figure 2:
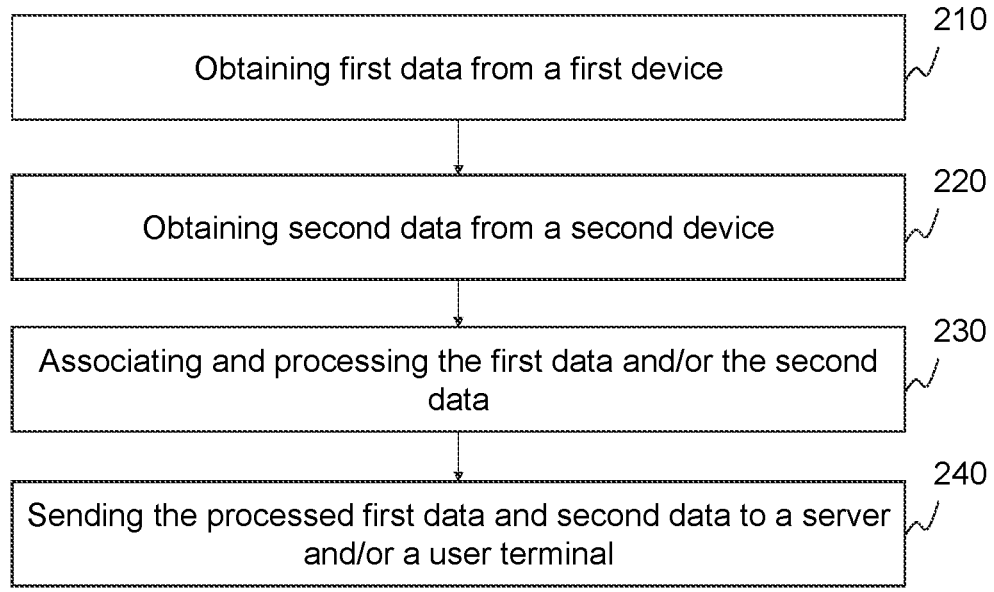
FIG. 2 is a flowchart illustrating an exemplary process for security control according to some embodiments of the present disclosure.

FIG. 2 is a flowchart illustrating an exemplary process for security control according to some embodiments of the present disclosure. In some embodiments, one or more operations in the process 200 may be implemented in the security control system 100 shown in FIG. 1. For example, the one or more operations in the process 200 may be stored in a storage device in the form of instructions and may be called and/or executed by one or more processors. In some embodiments, the process 200 may be implemented on one or more processors in the security device 130.

In 210, first data may be obtained from a first device.

In some embodiments, the first device may be installed outside a door to obtain monitoring data on the periphery of the access switch device. In some embodiments, the door may be applied to different scenarios, such as a door of a building (e.g., a residence, an office building) or a door of an independent room (e.g., a bedroom, a hospital ward). In some embodiments, the first device may include a monitoring data obtaining device (also referred to as a monitoring device) for obtaining information relating to the real-time situation of the scene where the first device is located. For example, the first device may include a camera, a peephole viewer, or the like. In some embodiments, the first data may include picture data or video data.

In 220, second data may be obtained from a second device.

In some embodiments, the second device may be installed on a door. For example, the second device may be installed on a same door where the first device is located. In some embodiments, the first device and the second device may be integrated into a single device. The first device may be installed outside the door to obtain monitoring data on the periphery of the door, and the second device may be installed on the door. In some embodiments, the door may be applied to different scenarios, such as a door of a building (e.g., a residence, an office building), or a door of an independent room (e.g., a bedroom, a hospital ward), or a door of a locker (e.g., a door of a safe, a box cover of a gun safe, a box cover of a lockbox, a box cover of a delivery box), etc. In some embodiments, the second device may include a security switch device for obtaining data of the second device. For example, the second device may include a smart lock. In some embodiments, the second data may include at least one of operation instructions, execution results of the operation instructions, identity information of an operator, or a password. In some embodiments, the operation instructions may be referred to as indication signals used to control the second device to perform an operation, such as an unlocking instruction, a locking instruction, a back locking instruction, or the like. More descriptions of the operation instructions may be found in paragraph 123 of the present disclosure. In some embodiments, the operation instructions may be referred to as a record related to the indication signals, which may include indication content and an indication time so as to facilitate subsequent query when and what kind of operation indication the second device has received. In some embodiments, the execution results of the operation instructions may be referred to as whether the operation instructions are successfully executed, or a state reached after the second device executes the operation instructions, etc. In some embodiments, the identity information may include an operator's identity attribute, such as a household, a family member, a friend, an old user, a new user, etc. In some embodiments, operators of different identity attributes may use password information with different contents, and the system may distinguish the identity attributes of the corresponding operators through the password content. In some embodiments, the identity information may include biological characteristics that can uniquely identify an operator, for example, fingerprints, voiceprints, iris characteristics, or the like. The password may be used to verify whether the operator's operation instruction is legal, and only when the operation instruction is legal, the second device may execute the operation instruction. In some embodiments, the operation instruction may be input separately from the password. Merely by way of example, the operator may input the corresponding password after triggering an unlocking button. In some embodiments, the operation instruction may be input simultaneously with the password. Merely by way of example, it may be considered that an unlocking instruction is inputted when the operator inputs the password to the smart lock. In some embodiments, the password may be a character string that may include numbers, letters, or other characters, or any combination thereof. The password may be a biological characteristic that can uniquely characterize an operator, such as fingerprints, voiceprints, iris characteristics, facial characteristics, etc. In some embodiments, the second data may further include identifier information of the second device. The identifier information may uniquely identify the second device, including but not limited to an ID, a factory number, an event tag, a customized association tag, or the like etc. of the second device. In some embodiments, the identifier information may be used as an association identifier. More descriptions of the association identifier may be found in operation 230.

In 230, the first data and/or the second data may be associated and processed.

In some embodiments, the associating and processing may include separate processing of the first data and the second data to make the first data and the second data have an association condition. It may be understood that the associating and processing of the first data may be independently executed by a processor of the first device, the associating and processing of the second data may be independently executed by a processor of the second device, a subsequent processing device (such as the server 110) may obtain the first data and the second data from the first device and the second device respectively, and the subsequent processing device may associate the first data and the second data after obtaining the first data and the second data under an association condition respectively. In some embodiments, the association condition being satisfied may include that the first data and the second data carry an obtaining time of the first data and an obtaining time of the second data, respectively. The obtaining time may include a time when the first data or the second data is obtained (or a timestamp, such as 08:30:00 on Oct. 1, 2019, Beijing time), or a time range for obtaining the first data or the second data (such as from 11:58 AM on May 5, 2018 to 12:03 on May 5, 2018, Beijing time). Merely by way of example, the obtaining time range carried by the first data is from 11:00 AM on May 5, 2018 to 11:30 AM on May 5, 2018, and the obtaining time carried by the second data is 11:10 AM on May 5, 2018. When the first data and the second data carry the obtaining time of the first data and the obtaining time of the second data, respectively, it may be considered that the first data and the second data are associated when the subsequent processing device receives the first data and the second data, an association relationship may be established between the first data and the second data. Merely by way of example, if the obtaining time range carried by the first data includes the obtaining time carried by the second data, an association relationship may be established between the first data and the second data.

In some embodiments, the associating and processing may include processing the first data and/or the second data to establish an association relationship between the first data and/or the second data. After being associated and processed, the first data and the second data may be logically associated together (for example, the first data and the second data may have a same association identifier, one party of the first data and the second data may carry an association identifier of the other party of the first data and the second data, or both of the first data and the second data may be retrieved based on a same association identifier). After being associated and processed, the first data and the second data may be physically associated together (for example, both of the first data and the second data may be encapsulated in a data packet to be sent and stored, or the content of the data of the one party may be carried in the data of the other party). In some embodiments, the association identifier may uniquely characterize the first device or the second device. In the present disclosure, the association identifier may include an ID, a factory number, an event tag, a customized association tag, or the like, of the first device or the second device.

In some embodiments, the first data and/or the second data being associated and processed may refer that one party carries the association identifier of the other party. For example, when the second device detects the second data, the first device may be controlled to collect the first data and integrate the association identifier related to the second data into the first data. In some embodiments, the second data may be an operation instruction or a password. For example, when the second device detects an operator inputs an operation instruction or a password, an instruction may be sent to the first device to instruct the first device to collect the first data. In some embodiments, the second data may be identity information, for example, an instruction may be sent to the first device when the second device recognizes the identity information of an operator. The second data that triggers the second device to send instructions to the first device is not limited in the present disclosure. In some embodiments, the association identifier related to the second data may include the ID, the factory number, the event tag, the customized association tag, or the like, of the second device. In some embodiments, when the first device detects the first data, an association identifier related to the first data may be obtained, and when the second device detects the second data within a preset time, the association identifier related to the first data may be integrated into the second data. In some embodiments, the association identifier related to the first data may include the ID, the factory number, the event tag, the customized association tag, or the like, of the first device. In some embodiments, the preset time may be a short time interval, such as 20 seconds or 10 seconds.

In some embodiments, the first data and/or the second data being associated and processed may refer that the content of the data of the one party is carried in the data of the other party. In some embodiments, a direct association relationship may be established between identity information from the second data and an operator image from the first data to integrate the identity information into the operator image. Specifically, a current operator image may be recognized form the first data using an image recognition algorithm, and the identity information in the second data associated with the first data may be obtained, so that an association relationship between the identity information and the operator image in the first data may be established, thereby obtaining the operator image marked with the identity information. The term "associated with" in the sentence that the identity information in the second data associated with the first data may be obtained may refer that the first data and the second data has been associated and processed as described in the operation. For example, the first data and the second data may be from a same security device and may have a matching relationship in time, or the data of the one party may carry an association identifier of the other party. In some embodiments, the identity information may include an identity attribute, such as a household, a family member, a friend, an old user, a new user, etc. In some embodiments, operators of different identity attributes may use password information of different contents, and the system may distinguish the identity attributes of the corresponding operators through the password contents. In some embodiments, the identity information may include an operator's biological characteristics such as fingerprints, voiceprints, iris characteristics, or the like. In some embodiments, the image recognition algorithm may be a face recognition algorithm. More descriptions about the face recognition algorithm may be found in FIG. 11 and relevant descriptions thereof, which will not be described herein. By marking the operator image with the identity information, the corresponding relationship between the identity information and the operator image may be established, which may facilitate the security device 130 to quickly recognize the operator's identity and take corresponding measures, thereby improving security.

In some embodiments, the identity of the current operator may be determined based on the first data and the operator image marked with the identity information. Specifically, the first data may be obtained from the first device, and the current operator image may be recognized from the first data using the image recognition algorithm, thereby determining the identity of the current operator based on the current operator image and the operator image marked with the identity information. In some embodiments, corresponding measures may be taken based on the identity of the current operator. For example, if the current operator is a new operator (e.g., the current operator image has no identity information), the user of the first device may be contacted for confirmation. In such cases, at least a portion of the first data and/or at least a portion of the second data may be sent to the user terminal 140 associated with the first device for confirmation. As another example, if it is determined that the identity of the current operator indicates a suspicious person marked by the user, the alarm device of the security device 130 may be controlled to issue an alarm, or alarm information may be sent to the user terminal managed by the first device, or alarm information may be sent to security management personnel or security related equipment of the public security agency through the network. As another example, if it is determined that the identity of the current operator indicates unauthorized identity information, a state of the second device may be switched.

In some embodiments, a display unit may be controlled to be turned on or off based on one or more sensing signals obtained by a first sensing unit and a second sensing unit. Specifically, a first sensing signal may be obtained by one or more first sensing units, and the first device may be controlled to obtain the first data based on the first sensing signal, and the second sensing signal may be obtained through one or more second sensing units, so that the display unit may be controlled to be turned on or off based on the first sensing signal and the second sensing signal. The first data may be displayed when the display unit is turned on. The display unit may be set anywhere in a room, which will not be limited in the present disclosure. More descriptions about controlling the display unit to be turned on or off may be found in FIG. 16 and FIG. 17 and relevant descriptions thereof, which will not be described herein.

In 240, the processed first data and second data may be sent to the server and/or the user terminal.

In some embodiments, the processed first data and second data may include the first data and the second data that satisfy association conditions (for example, the first data carrying an obtaining time of the first data and the second data carrying an obtaining time of the second data). In such cases, the first data and the second data may be separately sent to a subsequent processing device. In some embodiments, the processed first data and second data may include the first data and the second data of which association relationship is established (for example, the first data and the second data of which the association relationship is established through the association identifier related to the first data; as another example, the first data and the second data of which the association relationship is established through the association identifier related to the second data). As yet another example, the first data and the second data of which association relationship is established may include an operator image marked with identity information. In such cases, the first data and the second data may be encapsulated in a same data packet to be sent.

In some embodiments, the user terminal may be a terminal device associated with the first device and the second device. In some embodiments, the first data and the second data may be sent to the server and/or the user terminal via a wireless network. In some embodiments, the associated first data and the second data may be sent to the server and/or the user terminal.

In some embodiments, alarm information may be sent to the associated user terminal. Specifically, in response to a determination that an alarm button on the security device 130 is triggered, alarm information may be sent to the associated user terminal. In response to a determination on a basis of the first data that there is an abnormal condition, alarm information may be sent to the associated user terminal. In some embodiments, it may be possible to determine whether there is an abnormal condition in the scene where the security device 130 is located based on a risk recognition model and the first data of the first device. More descriptions about the risk recognition model may be found in FIG. 7 and relevant descriptions thereof, which will not be described herein.

In some embodiments, a data request sent by the associated user terminal may be received. In some embodiments, the data request sent by the user terminal may include a request for the first data and/or the second data. In some embodiments, the first data and/or the second data may be provided to the associated user terminal based on the data request sent by the user terminal.

It should be noted that the above description regarding process 200 is merely provided for the purposes of illustration, and not intended to limit the scope of the present disclosure. For those skilled in the art, multiple variations and modifications may be made for the process 200 under the teachings of the present disclosure. However, those variations and modifications do not depart from the scope of the present disclosure.

Figure 3:
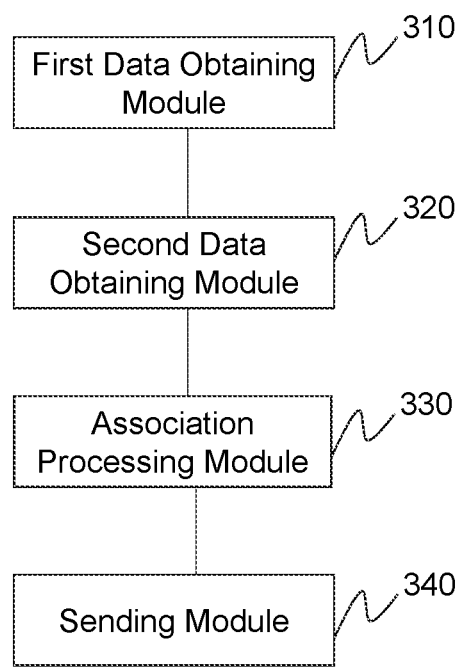
FIG. 3 is a schematic diagram illustrating an exemplary security control system according to some embodiments of the present disclosure.

FIG. 3 is a schematic diagram illustrating an exemplary security control system according to some embodiments of the present disclosure. As shown in FIG. 3, the security control system 300 may include a first data obtaining module 310, a second data obtaining module 320, an association processing module 330, and a sending module 340.

The first data obtaining module 310 may be configured to obtain first data by a first device. More descriptions about obtaining the first data by the first device may be found in the descriptions related to operation 210, which will not be repeated herein.

The second data obtaining module 320 may be configured to obtain second data by a second device. More descriptions about obtaining the second data by the second device may be found in the descriptions related to operation 220, which will not be repeated herein.

The association processing module 330 may be configured to associate and process the first data and/or the second data. More descriptions about the associating and processing of the first data and/or the second data may be found in the descriptions related to operation 230, which will not be repeated herein.

The sending module 340 may be configured to send the first data and the second data to a server and/or a user terminal. More descriptions about sending the first data and the second data to the server and/or the user terminal may be found in the descriptions related to operation 240, which will not be repeated herein.

It should be understood that the system and modules shown in FIG. 3 may be implemented in various ways. For example, in some embodiments, the system and its modules thereof may be implemented by hardware, software, or a combination of software and hardware. The hardware may be implemented by a specific logic. The software may be stored in a storage and executed by an appropriate instruction execution system, such as a microprocessor or dedicated design hardware. It will be understood by those skilled in the art that the above-mentioned methods and systems may be implemented using computer-executable instructions and/or embedded in control codes of a processor. For example, the control codes may be provided by a carrier medium, such as a disk, a CD or a DVD-ROM, a programmable storage such as a read-only memory (firmware), or a data carrier such as an optical carrier or an electronic signal carrier. The system and its modules thereof of the present disclosure may be implemented by a hardware circuit such as super large-scale integrated circuits or a gate arrays, a semiconductor such as a logic chip, a transistor, etc., or a programmable hardware device such as a field programmable gate array, a programmable logic device, etc. The system and its modules thereof may be implemented by software that can be executed by various processors, or may be implemented by a combination (e.g., firmware) of the hardware circuit and the software.

Figure 4:
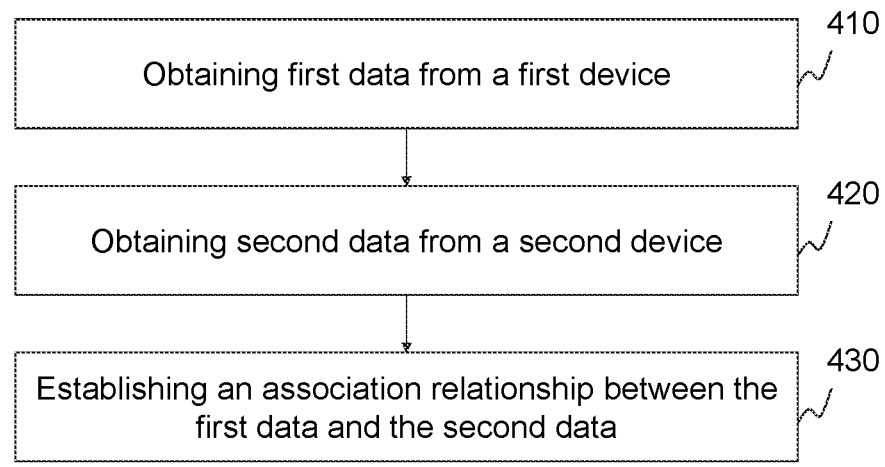
FIG. 4 is a flowchart illustrating an exemplary process for managing security data according to some embodiments of the present disclosure.

FIG. 4 is a flowchart illustrating an exemplary process for managing security data according to some embodiments of the present disclosure. In some embodiments, one or more operations in the process 400 may be implemented in the security control system 100 shown in FIG. 1. For example, one or more of the process 400 may be stored in a storage device in the form of instructions and may be called and/or executed by the server 110.

In 410, first data may be obtained from a first device.

In some embodiments, the server 110 may obtain the first data by communicating with the first device. More descriptions about the first data of the first device may be found in the descriptions related to the operation 210, and will not be repeated herein.

In 420, second data may be obtained from a second device.

In some embodiments, the server 110 may obtain the second data by communicating with the second device. More descriptions about the second data of the second device may be found in the descriptions related to operation 220, which will not be repeated herein. In some embodiments, the operations 410 and 420 may performed locally in an integrated device of the first device and the second device (e.g., a camera and a smart lock may be integrated into a smart lock with the camera and biometric module).

In 430, an association relationship may be established between the first data and the second data.

In operation 430, the server 110 may receive the first data and the second data that satisfy the association condition, and associates the first data and the second data logically (for example, the first data and the second data may have a same association identifier, one party may carry an association identifier of the other party, or both may be retrieved based on a same association identifier) or physically together (for example, both may be encapsulated in a data packet to be sent and stored, or the contents of the data of the one party may be carried in the data of the other party). In some embodiments, the server 110 may logically associate the first data with the second data according to the association identifier related to the second data carried in the first data or the association identifier related to the first data carried in the second data, and a first access control identifier carried in the first data or a second access control identifier carried in the second data. For example, the association identifier carried by the data and a device identifier of a device corresponding to the data may be used as a retrieval keyword of the data and stored together with the data. In the subsequent processing, the first data and the second data with the retrieval keyword may be obtained together based on the retrieval keyword. As another example, the association identifier carried by certain data and the data from the device corresponding to the association identifier may be combined and stored.

In some embodiments, the server may establish a logical association or a physical association between the first data and the second data based on an obtaining time carried by the first data of the first device and an obtaining time carried by the second data of the second device from a same security device. For example, when the obtaining time of data and the obtaining time of the other data has a time intersect or a time interval is less than a set threshold (e.g., 5S, 10S, 30S, etc.), an association relationship between the first data and the second data may be established. As an example, the obtaining time range carried by the first data is from 11:00 AM on May 5, 2018 to 11:30 AM on May 5, 2018, and the obtaining time carried by the second data is 11:10 AM on May 5, 2018. In such cases, in response to a determination that the obtaining time range carried by the first data includes the obtaining time carried by the second data, an association relationship between the first data and the second data may be established. In some embodiments, the server 110 may back up a corresponding relationship between the security device and its apparatus(es). When the server 110 receives the first data and the second data, it may be determined that the received first data and the second data is both from the same security device based on the corresponding relationship. In some embodiments, the server 110 may determine whether the first data and the second data are from the same security device based on the association identifier carried by the first data and the second data.

In some embodiments, the server 110 may recognize a current operator image from the first data using an image recognition algorithm, and obtain identity information in the second data associated with the first data, thereby establishing an association relationship between the identity information and the operator image in the first data, and obtaining the operator image marked with the identity information. The term "associated with" in the sentence that obtain the identity information in the second data associated with the first data may refer that the first data and the second data have been associated and processed described in the operation. For example, the first data and the second data are from a same security device and have a matching relationship in time, or the data of one party carries an associated identifier of the other party.

It should be noted that the above description regarding process 200 is merely provided for the purposes of illustration, and not intended to limit the scope of the present disclosure. For those skilled in the art, multiple variations and modifications may be made for the process 200 under the teachings of the present disclosure. However, those variations and modifications do not depart from the scope of the present disclosure. In some embodiments, the first data (e.g., peephole viewer data) and the second data (e.g., door lock data) may be associated with a same user identifier, and the second data may carry an identity attribute of an unlocker. In some embodiments, first data and second data associated with a same unlocking operation may be determined. in some embodiments, a face image included in the first data may be recognized using a face recognition algorithm. In some embodiments, a marked face image may be obtained by establishing an association relationship between the identity attribute carried by the second data and the face image included in the first data associated with the same unlocking operation. In some embodiments, the second data may carry an identity attribute of an unlocker, and the first data may be generated after the first device receives a video trigger instruction that is sent by the associated second device and carries the identity attribute of the unlocker. In some embodiments, a face image included in the first data may be recognized. In some embodiments, a marked face image may be obtained by establishing an association relationship between the identity attribute of the unlocker and the face image.

Figure 5:
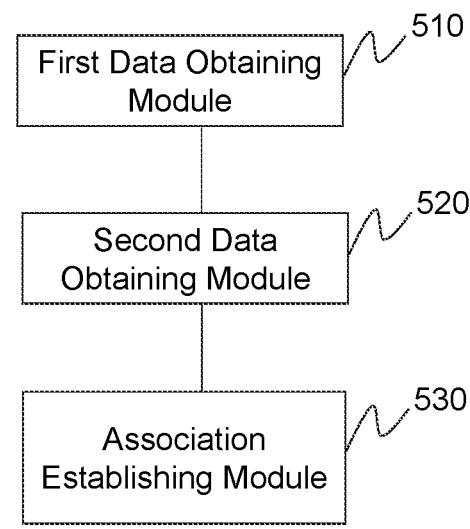
FIG. 5 is a schematic diagram illustrating an exemplary security data management system according to some embodiments of the present disclosure.

FIG. 5 is a schematic diagram illustrating an exemplary security data management system according to some embodiments of the present disclosure. As shown in FIG. 5, the security data management system 500 may include a first data obtaining module 510, a second data obtaining module 520, and an association establishing module 530.

The first data obtaining module 510 may be configured to obtain first data from a first device. More descriptions about obtaining the first data from the first device may be found in the descriptions related to operation 410, which will not be repeated herein.

The second data obtaining module 520 may be configured to obtain second data from a second device. More descriptions about obtaining the second data from the second device may be found in the descriptions related to operation 420, which will not be repeated herein.

The association establishing module 530 may be configured to establish an association between the first data and the second data. More descriptions about establishing the association between the first data and the second data may be found in the descriptions related to operation 430, which will not be repeated herein.

It should be understood that the system and modules shown in FIG. 5 may be implemented in various ways. For example, in some embodiments, the system and its modules thereof may be implemented by hardware, software, or a combination of software and hardware. The hardware may be implemented by a specific logic. The software may be stored in a storage and executed by an appropriate instruction execution system, such as a microprocessor or a dedicated design hardware. It will be understood by those skilled in the art that the above-mentioned methods and systems may be implemented using computer-executable instructions and/or embedded in control codes of a processor. For example, the control codes may be provided by a carrier medium, such as a disk, a CD or a DVD-ROM, a programmable storage such as a read-only memory (firmware), or a data carrier such as an optical carrier or an electronic signal carrier. The system and its modules thereof of the present disclosure may be implemented by a hardware circuit such as super large-scale integrated circuits or a gate arrays, a semiconductor such as a logic chip, a transistor, etc., or a programmable hardware device such as a field programmable gate array, a programmable logic device, etc. The system and its modules thereof may be implemented by software that can be executed by various processors, or may be implemented by a combination (e.g., firmware) of the hardware circuit and the software.

In some embodiments, the second device may include a monitoring device such as a smart peephole viewer, a camera, a visual camera device, a visual doorbell, a doorbell, an outdoor camera, an indoor camera, an audio collection device, a monitoring device integrated with a camera and/or a smart lock, etc. In some embodiments, the first device may include a smart door lock, or any other security switch device.

Figure 6:
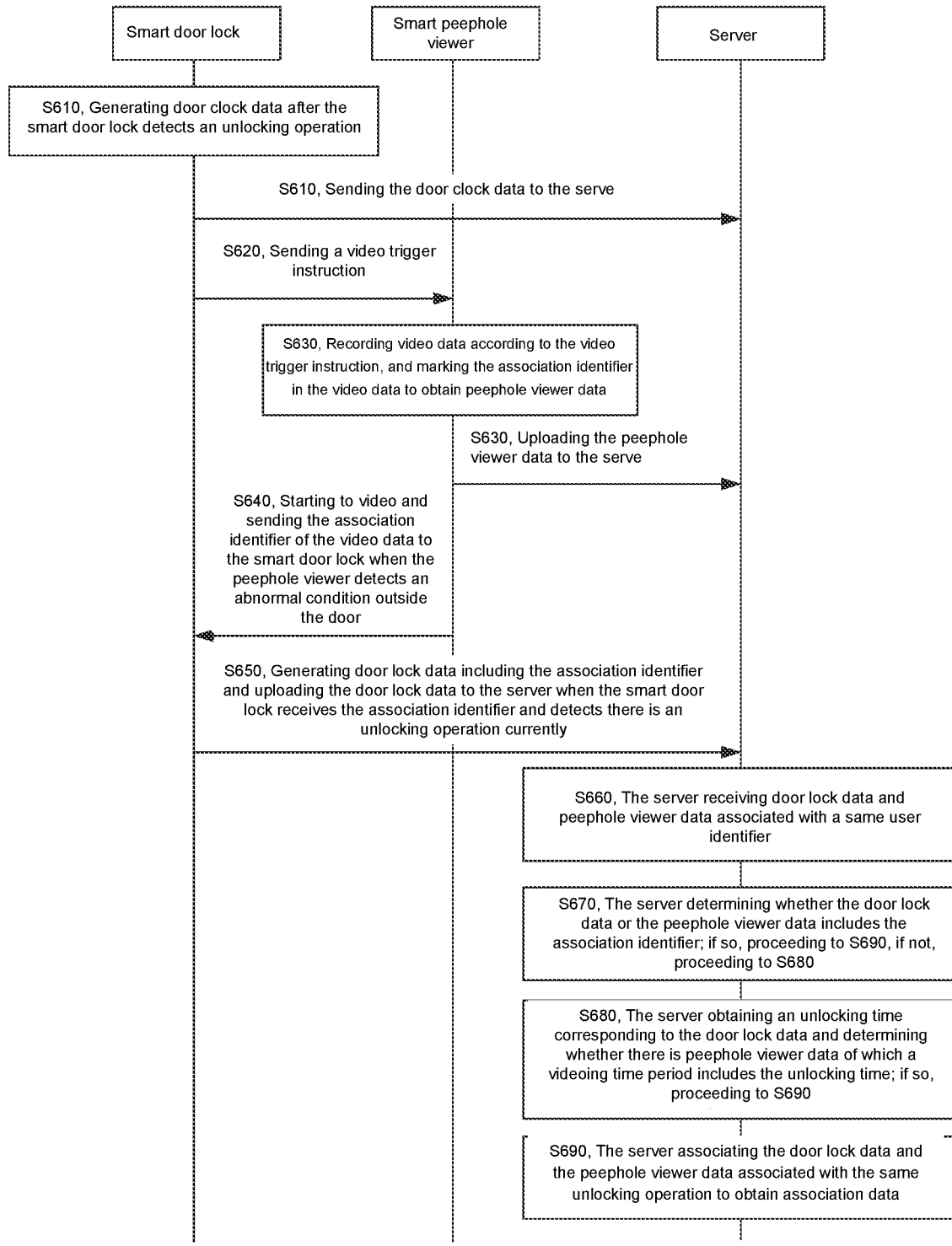
FIG. 6 is a flowchart illustrating an exemplary process for associating data according to some embodiments of the present disclosure.

FIG. 6 is a flowchart illustrating an exemplary process for associating data according to some embodiments of the present disclosure. The method may be applied to the system shown in FIG. 1. As shown in FIG. 6, the method may include the following operations.

In S610, door clock data may be generated after the smart door lock detects an unlocking operation, and the door clock data may be sent to a server.

In an application scenario of the present disclosure, the smart door lock may detect an unlocking operation and notify the smart peephole viewer to record video data.

The unlocking operation may include unlocking keys input by an unlocker, such as a password, fingerprint, door card recognition, a face image, a two-dimensional code, or unlocking information sent by smart devices. The door lock data may be data information associated with the unlocking operation. For example, a time of the unlocking operation or unlocking keys used for an unlocking operation. The door lock data may be uploaded to the server through a network (e.g., WiFi or mobile communication network). In some embodiments, the door lock data may carry a door lock identifier. More descriptions about the door lock identifier may be found in the descriptions of S320, which will not be repeated herein.

In S620, a video trigger instruction may be sent to the smart peephole viewer after the smart door lock detects the unlocking operation.

The video trigger instruction may be configured to trigger the smart peephole viewer to take videos or photos of outside environment. The video trigger instruction may carry an association identifier of the door lock data.

In some embodiments, the smart peephole viewer may include one or more smart peephole viewers. In some embodiments, a corresponding relationship between the user terminal, the smart door lock and the smart peephole viewer, and a corresponding relationship between the smart door lock and the smart peephole viewer may be established through the user terminal. More descriptions about establishing the corresponding relationships may be found in S360 and relevant descriptions thereof, which will not be repeated herein.

In the embodiment, the association identifier may include a data identity of the door lock data, and the association identifier may include a door lock identifier. In some embodiments, the door lock identifier may include a door lock ID, a door lock factory number, an event tag of the door, a customized association tag of the door, or the like. In some embodiments, the smart door lock may send a video trigger instruction to the associated smart peephole viewer through a network (e.g., WiFi or mobile communication network) or Bluetooth, and the video trigger instruction may carry a data identity of the door lock data.

The smart peephole viewer may carry the association identifier (e.g., the data identity of the door lock data) in the captured peephole viewer video data, thereby indicating that the door lock data and the peephole viewer data correspond to a same unlocking operation.

The present disclosure does not limit the execution order between each operation. For example, S610 and S620 may be performed simultaneously, or S620 may be performed before S610.

In S630, the smart peephole viewer may record video data according to the video trigger instruction, mark the association identifier in the video data to obtain peephole viewer data, and upload the peephole viewer data to the server.

The smart peephole viewer may add the association identifier (e.g., the data identifier of the door lock data) to the generated video data to obtain the peephole viewer data, and upload the peephole viewer data to the server. That is, the peephole viewer data generated by the smart peephole viewer according to the video trigger instruction sent by the smart door lock may carry the association identifier (the data identifier of the door lock data).

In S640, recording of video data may be started and the association identifier of the video data may be sent to the smart door lock when the peephole viewer detects an abnormal condition outside the door.

In another application scenario of the present disclosure, the smart peephole viewer may detect an abnormal condition outside the door, and send an association identifier to the smart door lock to facilitate the smart door lock to generate door lock data carrying the association identifier after detecting the unlocking operation.

The association identifier in the application scenario may include data identifier of the peephole viewer data generated by the smart peephole viewer, and the data identifier may include a peephole viewer identifier. The peephole viewer identifier may include a peephole viewer ID, a peephole viewer factory number, an event tag of the peephole viewer, a customized association tag of the peephole viewer, or the like. Specifically, the smart peephole viewer may send a peephole viewer identifier through a network (e.g., WiFi or mobile communication network) or Bluetooth to the associated smart door lock.

In S650, door lock data including the association identifier may be generated and the door lock data may be uploaded to the server when the smart door lock receives the association identifier and detects a current unlocking operation.

Specifically, the generated door lock data may carry the association identifier (a peephole viewer identifier). If the smart door lock receives the association identifier, but does not detect the current unlocking operation, the door lock data may not be generated. In S660, the server may receive door lock data and peephole viewer data associated with a same user identifier.

In some embodiments, there may be one or more user identifiers. For example, the user identifiers may include user terminal identifiers of an owner of the smart door lock and/or all family members. In some embodiments, the user terminal identifiers may include a user terminal ID, a user terminal factory number, an event tag of the user terminal, a customized association tag of the user terminal, or the like. The smart door lock and the smart peephole viewer installed on a same door may need to be associated with the user terminal (e.g., an APP installed on a smart mobile terminal). For example, an association relationship between the user terminal (e.g., a user ID registered on the user terminal by a user) and the smart door lock and the smart peephole viewer may be established through Bluetooth or other wireless communication manners on the mobile smart terminal. An association relationship between the user identifier, the smart door lock and the smart peephole viewer may be established by directly adding the association identifier of the smart door lock and the smart peephole viewer to the user terminal. By establishing the association relationship, a corresponding relationship between the smart door lock and the smart peephole viewer on the door may be established. In some embodiments, if a count of smart peephole viewers is larger than 1, the association relationship between the user identifier and the smart door lock and the plurality of smart peephole viewers may be established, and a corresponding relationship between the smart door lock and the plurality of smart peephole viewers may be established. The above association relationship (e.g., the association relationship between the user identifier and the smart door lock and the smart peephole viewer) may be uploaded and stored in the server.

The smart peephole viewer may carry the peephole viewer identifier when uploading peephole viewer data to the server. Similarly, the smart door lock may carry the door lock identifier when uploading the door lock data to the server. The server may determine the peephole viewer data and the door lock data associated with a same user identifier based on the corresponding relationship between the user identifier and the peephole viewer identifier and the door lock identifier.

In some embodiments, the server may further associate the door lock data or the peephole viewer data associated with the same user identifier with face images in a face image library. The server may recognize the face image included in the peephole viewer data and compare the face image with face images in the face image library. Specifically, the server may determine whether the face image included in the peephole viewer data and the face image in the face image library belong to a same user. If so, the door lock data, the peephole viewer data and the face image associated with the same user identifier may be associated.

In S670, the server may determine whether the door lock data or the peephole viewer data includes the association identifier. If so, it may be determined that the peephole viewer data and the door lock data is associated with a same unlocking operation, and S690 may be performed. If not, S680 may be performed.

After reading the door lock data and the peephole viewer data associated with the same user identifier, the server may determine whether the door lock data or the peephole viewer data includes the association identifier. For example, the server may read the door lock data and determine whether the door lock data includes the association identifier(s) (e.g., a door lock identifier or a peephole viewer identifier). If so, it may be determined that the door lock data and the peephole viewer data are associated with the same unlocking operation. The server may read the peephole viewer data and determine whether the peephole viewer data includes the association identifier(s) (e.g., a door lock identifier or a peephole viewer identifier). If so, it may be determined that the peephole viewer data and the door lock data are associated with the same unlocking operation.

In S680, the server may obtain an unlocking time corresponding to the door lock data and check whether there is peephole viewer data of which a videoing time period includes the unlocking time. If so, it may be determined that the peephole viewer data and the door lock data are associated with a same unlocking operation, and S690 may be performed. If not, it may be determined that there is no door lock data and peephole viewer data associated with the same unlocking operation.

If the door lock data or the peephole viewer data does not include the association identifier, the unlocking time included in the door lock data may be determined, and whether there is peephole viewer data of which the videoing time period (e.g., from the starting time to ending time of videoing) includes the unlocking time may be checked. If yes, it may be determined that the peephole viewer data and the door lock data are associated with the same unlocking operation. If no, it may be determined that there is no peephole viewer data associated with the door lock data. The smart door lock corresponding to the door lock data may be associated with the smart peephole viewer corresponding to the peephole viewer data.

For example, the unlocking time included in certain door lock data is 12:00 AM on May 5, 2018, and the peephole viewer data associated with a same user identifier may include peephole viewer data whose videoing time period is from 11:58 AM on May 5, 2018 to 12:03 on May 5, 2018. In such cases, the videoing time period may include the unlocking time, and it may be determined that the peephole viewer data and the door lock data is associated with the same unlocking operation.

In S690, the server may associate the door lock data and the peephole viewer data associated with the same unlocking operation to obtain associated data.

If the door lock data includes the association identifier, the peephole viewer data including the association identifier may be found according to the association identifier, and the door lock data and peephole viewer data may be associated to obtain a piece of associated unlocking data.

If the peephole viewer data includes the association identifier, the door lock data including the association identifier may be found according to the association identifier, and the door lock data and peephole viewer data may be associated to obtain a piece of associated unlocking data.

If the unlocking time corresponding to the door lock data is included in the videoing time period of the peephole viewer data, the associated door lock data and peephole viewer data may be associated to obtain a piece of associated unlocking data.

In some embodiments, the server may further associate the association identifier of the door lock data or the peephole viewer data with face image(s) in the face image library. The face image may be an image of an owner of the smart door lock (e.g., a household or a family member of a household). Specifically, the server may recognize the face image included in the peephole viewer data and compare the face image with the face image in the face image library, thereby determining whether the face image and the face image included in the peephole viewer data correspond to a same user identifier. If so, the association identifier of the peephole viewer data may be associated with the face image. Similarly, the server may further associate the association identifier of the door lock data with the face image through the association between the peephole viewer data and the door lock data.

In the data association method provided in the embodiment, the server may associate the door lock data and the peephole viewer data associated with the same user identifier, and may comprehensively use the door lock data and the peephole viewer. The two types of data may complement each other to provide more comprehensive information and data utilization may be improved.

In another application scenario of the present disclosure, after obtaining the associated unlocking data, the server may determine whether the current door opening scene is safe according to the data.

It should be noted that the above description regarding process 600 is merely provided for the purposes of illustration, and not intended to limit the scope of the present disclosure. For those skilled in the art, multiple variations and modifications may be made for the process 600 under the teachings of the present disclosure. However, those variations and modifications do not depart from the scope of the present disclosure. For example, the smart peephole viewer in FIG. 6 may be replaced by any other monitoring device described in the present disclosure. As another example, the smart door lock in FIG. 6 may be replaced by any other security switch device described in the present disclosure.

Figure 7:
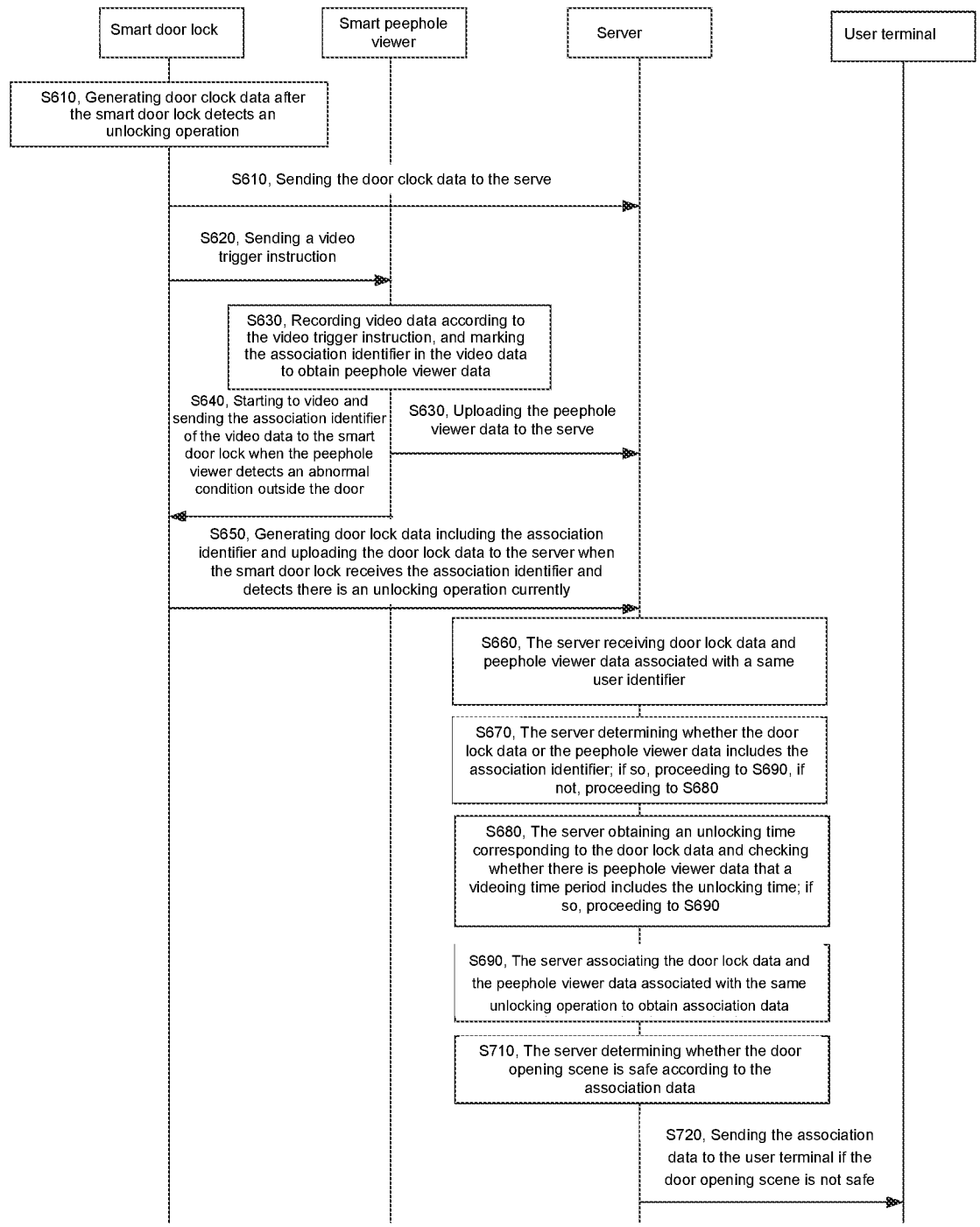
FIG. 7 is a flowchart illustrating another process for associating data according to some embodiments of the present disclosure.

FIG. 7 is a flowchart illustrating another process for associating data according to some embodiments of the present disclosure. The method may determine whether a current door opening scene is safe using the door lock data after associating the door lock data with the peephole viewer data.

In S710, the server may determine whether the door opening scene is safe according to the associated data.

The server may determine whether the door opening scene is safe according to the associated data. For example, the server may determine whether someone trails or hijacks according to videos taken by the smart peephole viewer. The server may determine whether an identity of the unlocker captured by the smart peephole viewer matches an identity corresponding to an unlocking password. In some embodiments, the server may determine whether the door opening scene is safe using a risk recognition model. In some embodiments, the risk recognition model may include a machine learning model obtained by training based on historical data. Specifically, the machine learning model may include but is not limited to a support vector machine model, a decision tree model, a neural network model, etc. In some embodiments, the risk recognition model may also include other models well known to those skilled in the art, for example, a migration learning model, a deep learning model, or the like, which will not be limited in the present disclosure.

In S720, the associated data may be sent to the user terminal if the door opening scene is not safe.

If the server determines that the current door opening scene is not safe according to the associated data, the associated data may be sent to a user terminal to facilitate the user to further confirm whether the current door opening scene is safe. If the user confirms that the current door opening scene is safe, the user may feedback the safety information to the server, and the server may not implement subsequent measures. If the user confirms that the current door opening scene is not safe, the user may feedback the unsafety information to the server, and the server may send the unsafety information to the property manager or give an alarm.

In the data association method provided in the embodiment, the server may obtain the door lock data and the peephole viewer data associated with the same user identifier, and determine the door lock data and the peephole viewer data associated with the same unlocking operation. Then, the door lock data and the peephole viewer data associated with the same unlocking operation may be associated, and the door opening scene may be determined whether it is safe according to the associated data. The method may combine the door lock data and the peephole viewer data, and the two types of data may complement each other to obtain a more accurate recognition result. For example, the method may recognize an abnormal condition such as someone trailing, hijacking, and misappropriating of unlocking information.

Corresponding to the embodiment described above, the present disclosure may provide an embodiment of a data association device.

Figure 8:
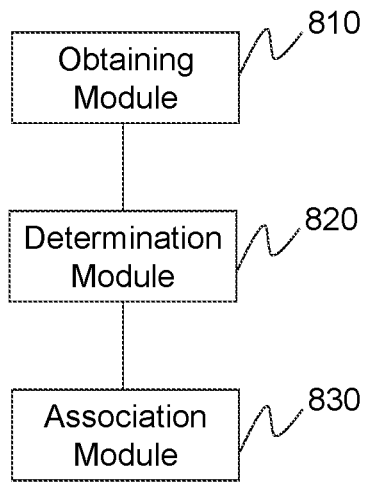
FIG. 8 is a block diagram illustrating a data association device according to some embodiments of the present disclosure.

FIG. 8 is a block diagram illustrating a data association device according to some embodiments of the present disclosure. The device may be applied to the server. As shown in FIG. 8, the device may include an obtaining module 810, a determination module 820, and an association module 830.

The obtaining module 810 may be configured to obtain door lock data uploaded by a smart door lock and peephole viewer data uploaded by a smart peephole viewer, the smart door lock and the smart peephole viewer being associated with a same user identifier.

After receiving the door lock data uploaded by the smart door lock and the peephole viewer data uploaded by the smart peephole viewer, the server may determine the door lock data and the peephole viewer data corresponding to the same identifier.

The determination module 820 may be configured to determine door lock data and peephole viewer data associated with a same unlocking operation.

In one embodiment of the present disclosure, the door lock data and the peephole viewer data may include a same association identifier, and it may be determined that the door lock data and the peephole viewer data including the same association identifier are associated with the same unlocking operation. The association identifier may be configured to characterize that the door lock data or the peephole viewer data includes peephole viewer data or door lock data associated with the same unlocking operation, respectively.

In another embodiment of the present disclosure, the door lock data or peephole viewer data may not include the association identifier. The door lock data and the peephole viewer data associated with the same unlocking operation may be determined according to an unlocking time recorded in the door lock data and a videoing time period recorded in the corresponding peephole viewer data (that is, associated with the same user identifier). The determination process may include one or more of the following operations.

The unlocking time corresponding to the door lock data may be obtained, and whether there is peephole viewer data of which a videoing time period includes the unlocking time may be determined according to the unlocking time. If there is peephole viewer data of which a videoing time period includes the unlocking time, it may be determined that the peephole viewer data and the door lock data are associated with the same unlocking operation.

The association module 830 may be configured to associate the door lock data and the peephole viewer data associated with the same unlocking operation to obtain associated data.

The door lock data and the peephole viewer data associated with the same unlocking operation determined by the determination module 820 may be associated to obtain the associated data.

In the data association device provided in the embodiment, the server may associate the door lock data and the peephole viewer data associated with the same user identifier, and may comprehensively use the door lock data and the peephole viewer data. The two types of data may complement each other to provide more comprehensive information and data utilization may be improved.

Alternatively, the data association device provided in the embodiment may include a security determination module and a sending module on the basis of the embodiment shown in FIG. 8.

The security determination module may be configured to determine whether the door opening scene is safe according to the associated data. The sending module may be configured to send the associated data to the user terminal when it is determined that the door opening scene is not safe.

Alternatively, the data association device provided in the embodiment may further include a processing module. The processing module may be configured to send the unsafety information to the property manager or give an alarm when a user confirms that the current door opening scene is not safe.

The embodiment may simultaneously use the door lock data and the peephole viewer data associated with the same unlocking operation to determine whether the door opening scene is safe. The two types of data may complement each other to obtain a more accurate recognition result. For example, the embodiment may recognize an abnormal condition such as someone trailing, hijacking, or misappropriating of unlocking information.

Corresponding to the embodiment of the data association device applied to the server, the present disclosure may further provide an embodiment of the data association device applied to the smart peephole viewer.

Figure 9:
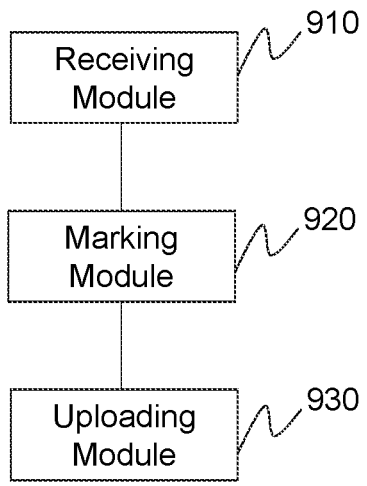
FIG. 9 is a block diagram illustrating another data association device according to some embodiments of the present disclosure.

FIG. 9 is a block diagram illustrating another data association device according to some embodiments of the present disclosure. The device may be applied to a smart peephole viewer. As shown in FIG. 9, the device may include a receiving module 910, a marking module 920, and an uploading module 930.

The receiving module 910 may be configured to receive a video trigger instruction sent by a smart door lock associated with the smart peephole viewer.

The video trigger instruction may be generated after the smart door lock detects an unlocking operation, and the video trigger instruction may carry an association identifier of door lock data (e.g., a door lock identifier), and the door lock data may be generated after the smart door lock detects the unlocking operation.

The marking module 920 may be configured to record video data of an outside environment according to the video trigger instruction, and mark the association identifier (e.g., door lock identifier) associated with the door lock data in the video data to obtain peephole viewer data.

The uploading module 930 may be configured to upload the peephole viewer data to a server.

The server may determine, according to the association identifier, the door lock data and the peephole viewer data associated with the unlocking operation and associate the door lock data and the peephole viewer data.

In an embodiment of the present disclosure, when sensing an abnormal condition outside the door, the smart peephole viewer may record the video data of the outside environment, and send the association identifier (e.g., the peephole viewer identifier) associated with the peephole viewer data to the smart door lock. When receiving the association identifier of the peephole viewer data and detecting that there is an unlocking operation currently, the smart door lock may generate door lock data carrying the association identifier (e.g., the peephole viewer identifier).

In the data association device provided in the embodiment, the smart peephole viewer may record video data after receiving the video trigger instruction of the association identifier (e.g., the door lock identifier) carried in the door lock data sent by the smart door lock, and add the association identifier to the obtained video data to obtain the peephole viewer data with the association identifier (e.g., the door lock identifier) and upload the data to the server. The server may determine the door lock data and the peephole viewer data associated with the same unlocking operation according to the association identifier in the peephole viewer data. The server may associate the door lock data and the peephole viewer data associated with the same user identifier, and may comprehensively use the door lock data and the peephole viewer data. The two types of data may complement each other to provide more comprehensive information and data utilization may be improved.

Corresponding to the data association device applied to the peephole viewer, the present disclosure may further provide an embodiment of a data association device applied to a smart door lock.

Figure 10:
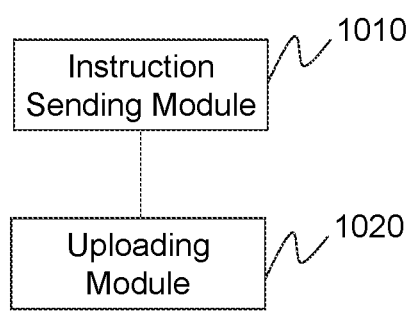
FIG. 10 is a block diagram illustrating still another data association device according to some embodiments of the present disclosure.

FIG. 10 is a block diagram illustrating still another data association device according to some embodiments of the present disclosure. The device may be applied to a smart door lock. As shown in FIG. 10, the device may include an instruction sending module 1010 and an uploading module 1020.

The instruction sending module 1010 may be configured to generate door lock data after detecting an unlocking operation, and send a video trigger instruction to a smart peephole viewer associated with the smart door lock. The video trigger instruction may be configured to trigger the smart peephole viewer to take videos or photos of outside environment, and carry an association identifier of the door lock data.

The uploading module 1020 may be configured to upload the door lock data to a server to facilitate the server to determine, according to the association identifier (e.g., the door lock identifier) of the door lock data, the door lock data and the peephole viewer data associated with the unlocking operation, and associate the door lock data and the peephole viewer data.

In the data association device provided in the embodiment, when detecting the unlocking operation, the smart door lock may send the video trigger instruction to the smart peephole viewer associated with the smart door lock. After receiving the video trigger instruction, the smart peephole viewer may take the videos or photos of outside environment, and obtain the peephole viewer data carrying the association identifier (e.g., the door lock identifier) of the door lock data. The server may find the door lock data and the peephole viewer data associated with the same unlocking operation according to the peephole viewer data carrying the door lock identifier and the association identifier (e.g., the door lock identifier) carried in the door lock data. In this way, the door lock data and the peephole viewer data may be used comprehensively, and the two types of data may complement each other to provide more comprehensive information and data utilization may be improved.

For ease of description, the foregoing embodiments are described as a series of action combinations. However, those skilled in the art should understood that the present disclosure is not limited to the described sequence of actions, because certain operations may be performed in other orders or at the same time according to the present disclosure. Those skilled in the art should know that the embodiments described in the present disclosure are all preferred embodiments, and the operations and modules involved are not necessarily required by the present disclosure.

Figure 11:
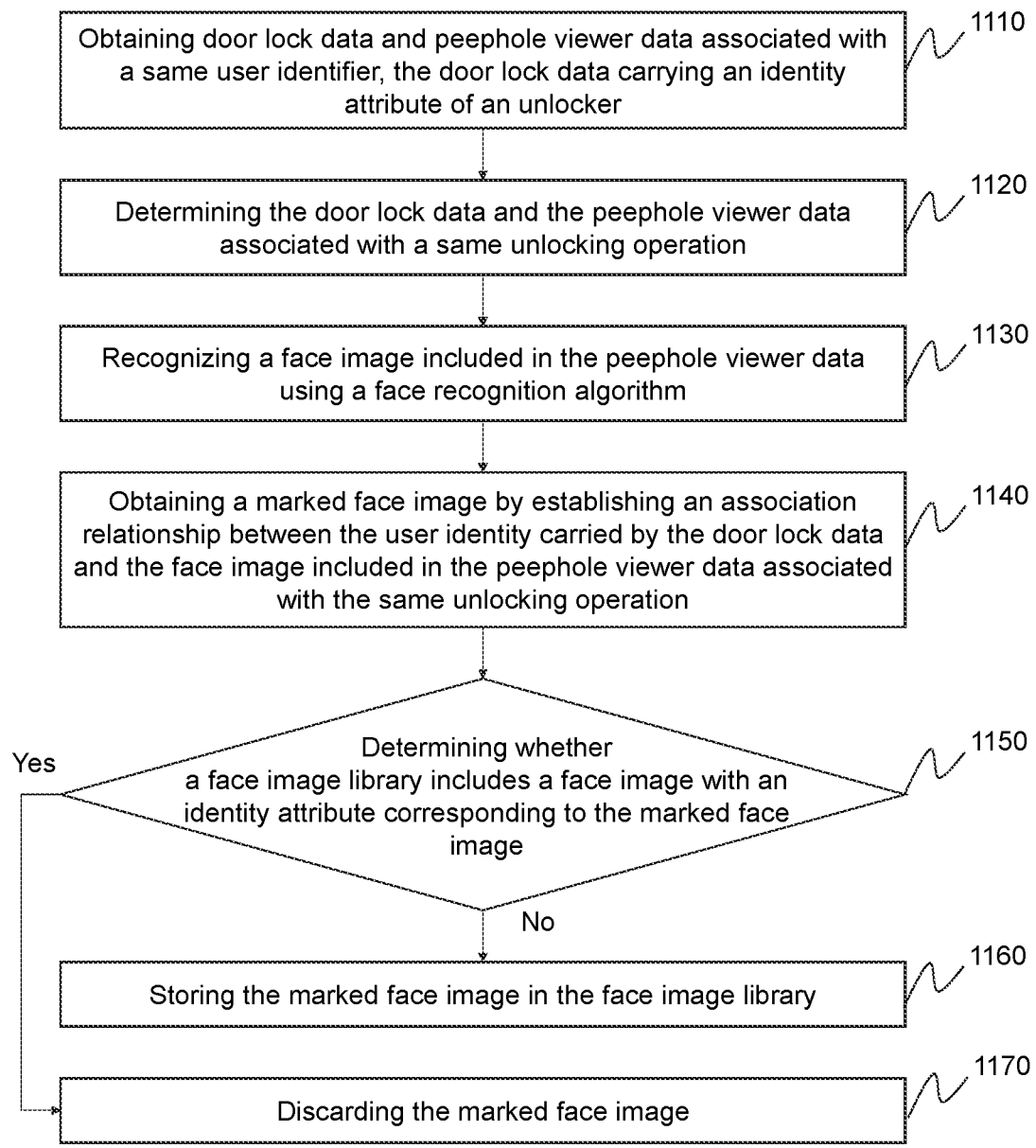
FIG. 11 is a flowchart illustrating an exemplary process for marking a user identity attribute of data according to some embodiments of the present disclosure.

FIG. 11 is a flowchart illustrating an exemplary process for marking a user identity attribute of data according to some embodiments of the present disclosure.

In the embodiment, the server may receive door lock data uploaded by a smart door lock, and peephole viewer data uploaded by a smart peephole viewer, and then mark a face image in the peephole viewer data according to an identity attribute of an unlocker carried in the door lock data.

The method may be applied to a server. As shown in FIG. 11, the method may include one or more of the following operations.

In S1110, the door lock data and the peephole viewer data associated with a same user identifier may be obtained, and the door lock data may carry an identity attribute of an unlocker.

In some embodiments, the unlocker may include a person performing an unlocking operation. In some embodiments, a count of the user identifiers may be larger than or equal to 1. For example, the user identifier may include user terminal identifiers of an owner and/or of all family members of the smart door lock. In some embodiments, the user terminal identifier may include a user terminal ID, a user terminal factory number, an event tag of the user terminal, a customized association tag of the user terminal, or the like. The smart door lock and the smart peephole viewer installed on a same door may need to be associated with the user terminal (e.g., an APP installed on a smart mobile terminal). For example, an association relationship between the user terminal (e.g., a user ID registered on the user terminal by a user), the smart door lock and the smart peephole viewer may be established through Bluetooth or other wireless communication manners. The identifier of the smart door lock and the smart peephole viewer may be directly input into the user terminal, and the association relationship between the user identifier, the smart door lock and the smart peephole viewer may be established. The above association relationship (e.g., the association relationship between the user identifier, the smart door lock and the smart peephole viewer) may be uploaded and stored in the server. More descriptions about the association relationship may be found in operation 606 and relevant descriptions thereof, which will not be repeated herein.

The peephole viewer data may carry the peephole viewer identifier when the smart peephole viewer uploads the peephole viewer data to the server. Similarly, the door lock data may carry the door lock identifier when the smart door lock sends the door lock data to the server. The server may determine the door lock data and peephole viewer data associated with the same user identifier according to the corresponding relationship between the user identifier and the peephole viewer identifier and between the user identifier and the door lock identifier.

If the unlocker uses unlocking key with an identity attribute (for example, the unlocking password with identity attribute) to unlock the smart door lock, the smart door lock may recognize the identity of the unlocker, integrate the identity attribute to the door lock data and send the identity attribute to the server.

In S1120, the door lock data and the peephole viewer data associated with a same unlocking operation may be determined.

After obtaining the door lock data and the peephole viewer data associated with the same user identifier, the server may search the door lock data and the peephole viewer data associated with the same unlocking operation.

The unlocking operation may be an operation of a person operating a door lock. In some embodiments, the unlocking operation may include a password unlocking, a fingerprint unlocking, a door card recognition unlocking, a face image recognition unlocking, a two-dimensional code scanning unlocking, and unlocking information sent by smart devices.

In an application scenario of the present disclosure, the door lock data or peephole viewer data may include association identifier(s), and the server may find the door lock data and peephole viewer data associated with the same unlocking operation according to the association identifier.

One scenario may be that the smart door lock detects the unlocking operation and generate door lock data. If the door lock data includes the identity attribute of the unlocker, the smart door lock may send a video trigger instruction to the smart peephole viewer, and the video trigger instruction may include the associated identifier. After receiving the video trigger instruction, the smart peephole viewer may record video data of the outside environment, add the obtained associated identifier to the video data to obtain the peephole viewer data including the association identifier, and finally upload the peephole viewer data to the server. That is, the smart peephole viewer generated by the smart peephole viewer according to the video triggered instruction sent by the smart door lock may carry the association identifier. In the application scenario, the association identifier may be the data identifier of the door lock data. More descriptions about the data identifier of the door lock data may be found in FIG. 6 and relevant descriptions thereof, which will not be repeated herein.

Another scenario may be that the smart peephole viewer detects an abnormal condition outside the door, and sends an association identifier to the smart door lock to facilitate the smart door lock to receive the association identifier and generate the door lock data carrying the association identifier after the smart door lock detects the unlocking operation. In the application scenario, the association identifier may be the data identity of the peephole viewer data. More descriptions about the data identifier of the peephole viewer data may be found in FIG. 6 and relevant descriptions thereof, which will not be repeated herein.

In another application scenario of the present disclosure, the door lock data and the peephole viewer data may not include the association identifier, and the server may find the door lock data and the peephole viewer data associated with the same unlocking operation according to the unlocking time corresponding to the door lock data, and the videoing time period of the peephole viewer data. The smart door lock corresponding to the door lock data may be associated with the smart peephole viewer corresponding to the peephole viewer data.

If the door lock data and the peephole viewer data do not include the associated identifier, the unlocking time of the door lock data may be determined for a piece of door lock data, and it may be determined whether there is peephole viewer data of which the videoing time period includes the unlocking time. If so, it may be determined that the door lock data and the peephole viewer data associated with the same unlocking data is found.

In S1130, a face image included in the peephole viewer data may be recognize using a face recognition algorithm.

After finding the door lock data and peephole viewer data associated with the same unlocking operation, the face image included in the peephole viewer data may be recognized using the face recognition algorithm. In some embodiments, using the face recognition algorithm, a main face area may be cut out after a face is detected and key feature points of the face is positioned, and the main face area may be input to a back end recognition algorithm after being pretreated. The recognition algorithm may perform the extraction of face features, and compare the features with the known faces in a database to complete a final classification. In some embodiments, the face recognition algorithm may be a geometrical feature-based algorithm. In some embodiments, the face recognition algorithm may be a template-based algorithm. Exemplary face recognition algorithm may include an association matching-based algorithm, an eigenface-based algorithm, a linear discriminant analysis-based algorithm, a singular value decomposition-based algorithm, a neural network-based algorithm, and a dynamic link matching-based algorithm, etc. In some embodiments, the face recognition algorithm may be a model-based algorithm (for example, a hidden Markov model-based algorithm, an active shape model-based algorithm, and an active appearance model-based algorithm, etc.). The face image included in the peephole viewer data may be recognized using the face recognition algorithm.

In S1140, a marked face image may be obtained by establishing an association relationship between the user identity carried by the door lock data and the face image included in the peephole viewer data associated with the same unlocking operation.

In the door lock data and the peephole viewer data associated with the same unlocking operation, an identity attribute of the unlocker included in the door lock data may be marked on the face image included in the peephole viewer data to obtain the marked face image. By marking the identity attribute on the face image, the identity information of the unlocker may be added to the face image, and accordingly, the face image with the identity attribute of the unlocker may be obtained.

Alternatively, after the marked face image is obtained, the method may further include one or more of the following operations.

In S1150, it may be determined whether a face image library includes a face image with an identity attribute corresponding to the marked face image. If not, S1160 may be performed. If so, S1170 may be performed.

The face image library may be configured to store face images marked with identity attributes. In the present embodiment, the obtained marked face image may be stored in the face image library to realize automatic marking of the face image and adding of the face image to the face image library. Before the marked face image is stored in the face image library, it may be determined whether the current face image library includes the face image corresponding to the identity attribute of the marked face image, avoiding storing redundant face images with the same identity attribute in the face image library and occupying the space of the database.

In S1160, the marked face image may be stored in the face image library.

If the current face image library does not include a face image corresponding to the identity attribute of the marked face image, the marked face image may be stored in the face image library, so that the marked face image may be automatically added to the face image library.

In S1170, the marked face image may be discarded.

In some embodiments, if the current face image library includes a face image corresponding to the identity attribute, the marked face image may be discarded.

In other embodiments of the present disclosure, if the current face image library includes a face image corresponding to the identity attribute of the marked face image, the marked face image may be used to replace the face image corresponding to the same identity attribute in the face image library to facilitate real-time updating of the face image in the face image library. In some embodiments, the server may also set a count of face images with a same identity attribute in the face image library (e.g., 3). For example, if the face image library already includes 3 face images with the same identity attribute, when the latest marked face image is obtained, the marked face image may be discarded, or the earliest face image corresponding to the same identity attribute in the face database may be replaced to update the face image in the face image library.

In the method for marking a user identity attribute of data provided in the embodiment, when the server receives the door lock data generated by the smart door lock carrying an identity attribute of an unlocker, the server also receives the peephole viewer data associated with the door lock data sent by the smart peephole viewer at the same time, in which the peephole viewer data may carry the identity attribute of the unlocker. Then, the server may combine the identity attribute of the unlocker carried by the door lock data and the face image in the peephole viewer data to automatically mark the face image to obtain a marked face image, which may not require the user to manually add a face photo and mark it manually, thereby increasing the efficiency of marking face images. Moreover, the marked face image may also be added to the face image library to realize the automatic input of face images, which may improve the efficiency of face image input.

Figure 12:
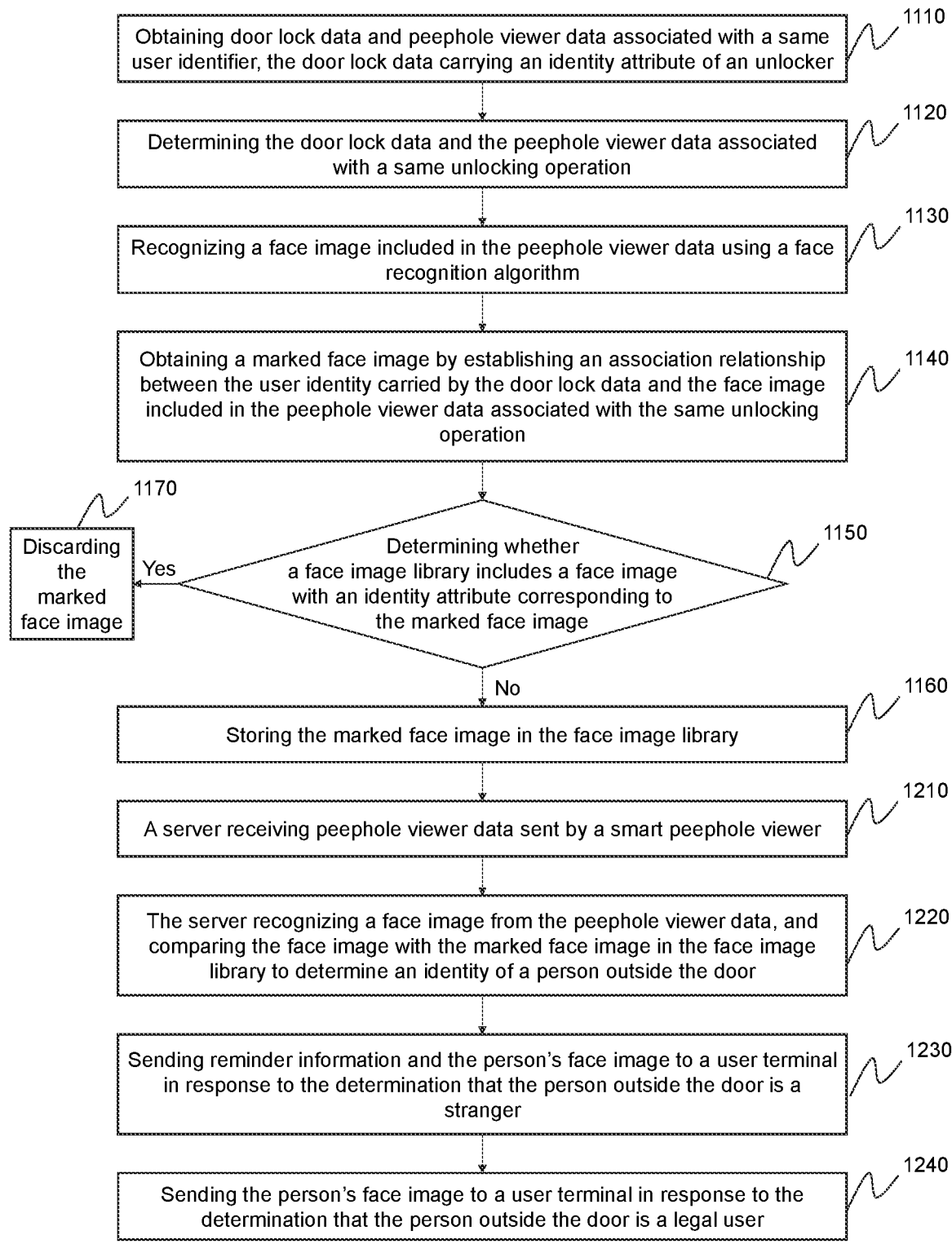
FIG. 12 is a flowchart illustrating another process for marking a user identity attribute of data according to some embodiments of the present disclosure.

FIG. 12 is a flowchart illustrating another process for marking a user identity attribute of data according to some embodiments of the present disclosure.

In some embodiments, whether a current door opening scene is safe may be determined using a face image of a person outside the door taken by a smart peephole viewer. As shown in FIG. 12, on the basis of the embodiment shown in FIG. 11, the method may further include one or more of the following operations.

In S1210, a server may receive peephole viewer data sent by the smart peephole viewer.

In an application scenario, the smart peephole viewer may detect someone outside the door, and record video data of the outside scene to obtain the peephole viewer data, and send the peephole viewer data to the server to recognize an identity of the person outside the door.

In another application scenario, when a smart door lock detects an unlocking operation, the smart door lock may notify the smart peephole viewer to record video data, and the smart peephole viewer may send the peephole viewer data to the server to recognize an identity of the person outside the door.

In S1220, the server may recognize a face image from the peephole viewer data, and compare the face image with the marked face image in the face image library to determine the identity of the person outside the door.

The server may first identify the face image from the peephole viewer data sent by the smart peephole viewer, and then compare the face image with the face image that has a marked identity attribute in the face image library to determine the identity of the person outside the door. In some embodiments, the identity of person outside the door may include a homeowner, relatives and friends of the homeowner, or a stranger.

In S1230, reminder information and the person's face image may be sent to a user terminal in response to the determination that the person outside the door is a stranger.

If the face image library does not include a face image of the person outside the door, it may be determined that the person outside the door is a stranger, and then reminder information may be sent to the user terminal to remind the user that a stranger may break in. At the same time, the face image of the person outside the door may be pushed to the user terminal, and the user may further determine the identity of the face image. In some embodiments, after the user determines the identity of the face image, the user may also feed back confirmation information to the server. In some embodiments, the confirmation information may include the user determining that the identity of the face image is a legal user or the user determining that the identity of the face image is an illegal user. In some embodiments, if the confirmation information received by the server indicates that the user determines the identity of the face image is an illegal user, the server may notify the property manager or give an alarm. In some embodiments, if the confirmation information received by the server indicates that the user determines that the identity of the face image is a legal user, the server may send confirmation information to the user terminal.

In S1240, the person's face image may be sent to a user terminal in response to the determination that the person outside the door is a legal user.

If the face image library includes a face image of the person outside the door, the person outside the door may be determined to be a legal identity, and the face image and the identity of the person outside the door may be sent to the user terminal, so that the user may know a situation at home in real time.

In the method for marking the user identity attribute of the data provided in the embodiment, after the face image taken by the smart peephole viewer is marked according to the identity attribute carried by the door lock data, the marked face image may be stored in the face image library. When the user appears again, the server may recognize the identity of the user directly according to the marked face image in the face image library, thereby realizing automatic adding of face images, and automatic determination of the identity of the person outside the door.

Figure 13:
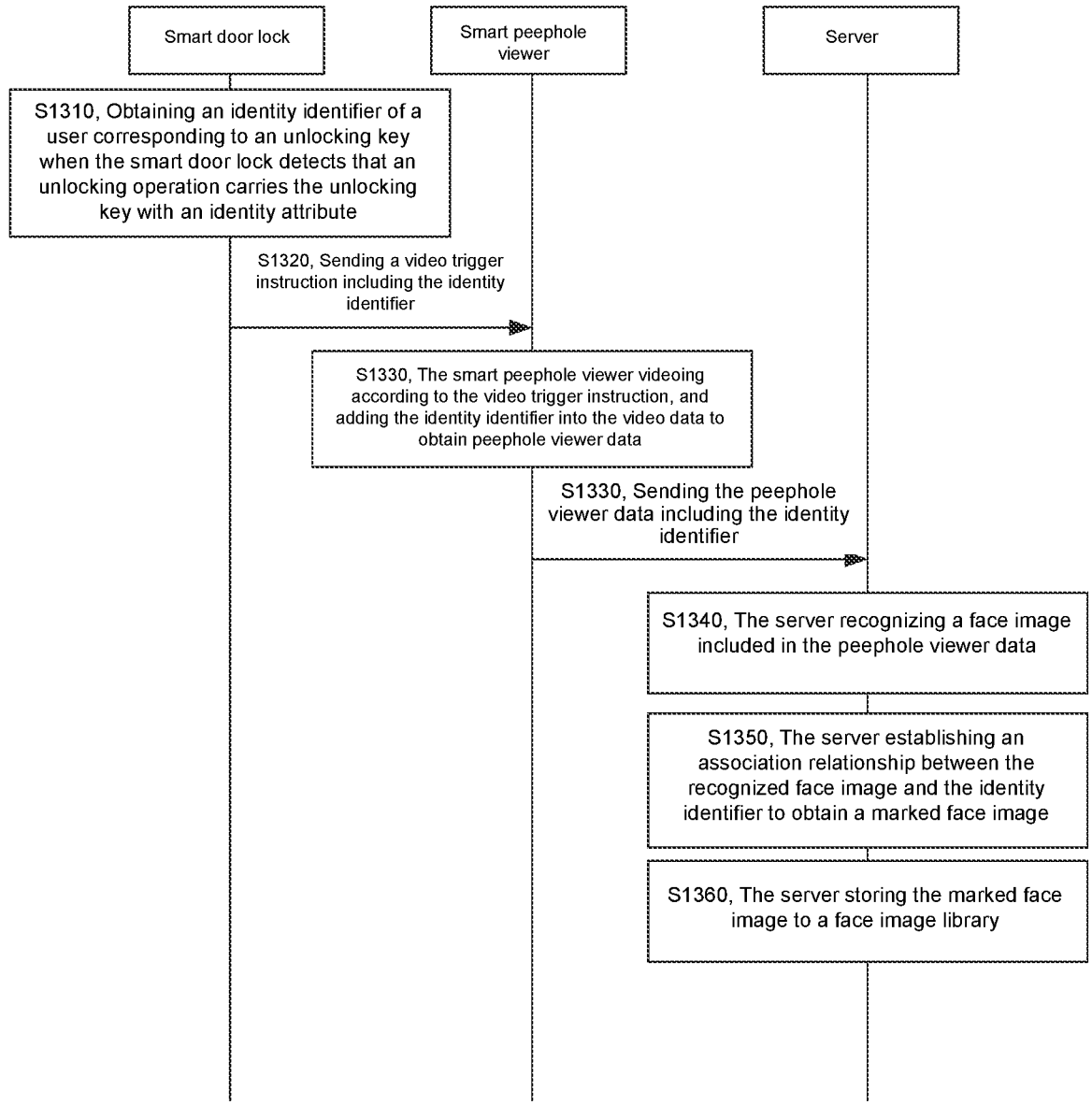
FIG. 13 is a flowchart illustrating still another process for marking a user identity attribute of data according to some embodiments of the present disclosure.

FIG. 13 is a flowchart illustrating still another process for marking a user identity attribute of data according to some embodiments according to some embodiments of the present disclosure.

In the embodiment, when the identity attribute of the unlocker is carried in the door lock data, the smart door lock may send the identity attribute to the smart peephole viewer, the smart peephole viewer may generate peephole viewer data including the identity attribute and send the data to the server, and then the server may use the identity attribute carried by the peephole viewer data to mark the face image in peephole viewer data.

As shown in FIG. 13, the method may include one or more of the following operations.

In S1310, an identity identifier of a user corresponding to an unlocking key may be obtained when the smart door lock detects that an unlocking operation carries the unlocking key with an identity attribute.

If the unlocker uses the unlocking key with identity attributes (for example, an unlocking password, an unlocking fingerprint, a door card, a face image, a two-dimensional code or unlocking information sent by a smart device, etc.) to unlock the lock, the smart door lock may recognize the identity of the unlocker and send the identity to the smart peephole viewer.

In S1320, a video trigger instruction including the identity identifier may be sent to the smart door lock.

If the unlocking operation is detected, the smart door lock may notify the smart peephole viewer associated with the smart door lock to record video data, and send the identity of the unlocker to the smart peephole viewer. More descriptions about the association between the smart door lock and the smart peephole viewer may be found in FIG. 3 and relevant descriptions thereof, which will not be repeated herein.

In S1330, the smart peephole viewer may record video data according to the video trigger instruction, add an identity identifier into the video data to obtain peephole viewer data, and send the peephole viewer data including the identity identifier to the server.

After receiving the video trigger instruction, the smart peephole viewer may start to record video data in response to the video trigger instruction, and mark the identity identifier of the unlocker sent by the smart door lock in the video data and send the identifier to the server.

In S1340, the server may recognize a face image included in the peephole viewer data.

The server may recognize the face image from the video data using a face recognition algorithm and extract the identity identifier from the peephole viewer data. More descriptions about the face recognition algorithm may be found in FIG. 9 and relevant descriptions thereof, which will not be repeated herein.

In S1350, the server may establish an association relationship between the recognized face image and the identity identifier to obtain a marked face image.

The server may mark the recognized face image with the identity identifier carried in the peephole viewer data to obtain the marked face image. More descriptions about the marked face image may be found in FIG. 9 and relevant descriptions thereof, which will not be described herein.

In S1360, the server may store the marked face image to a face image library.

Then, the marked face image may be stored in the face image library. When the unlocker appears again, the server may directly recognize the identity of the user from the videos or photos taken by the smart peephole viewer using the face recognition algorithm, thereby automatically recognizing the user identity according to the videos and photos without the user manually establishing recognition data (face images with identity identifiers).

In the method for marking a user identity attribute of data provided in the embodiment, the user identity obtained by the smart door lock may be sent to the smart peephole viewer, the smart peephole viewer may upload the user identity and the user's photo or video to the server, the server may perform face recognition on the video uploaded by the smart peephole viewer, and mark the user identity in the recognized face image. In this way, associated data between the identity attribute of the unlocker and the face image may be automatically established, and the user may not need to manually establish the associated data between the face image and the identity attribute of the unlocker, which may reduce the burden on the user.

Corresponding to the embodiment of the method for marking a user identity attribute of data, the present disclosure may further provide an embodiment of a device for marking a user identity attribute of data.

Figure 14:
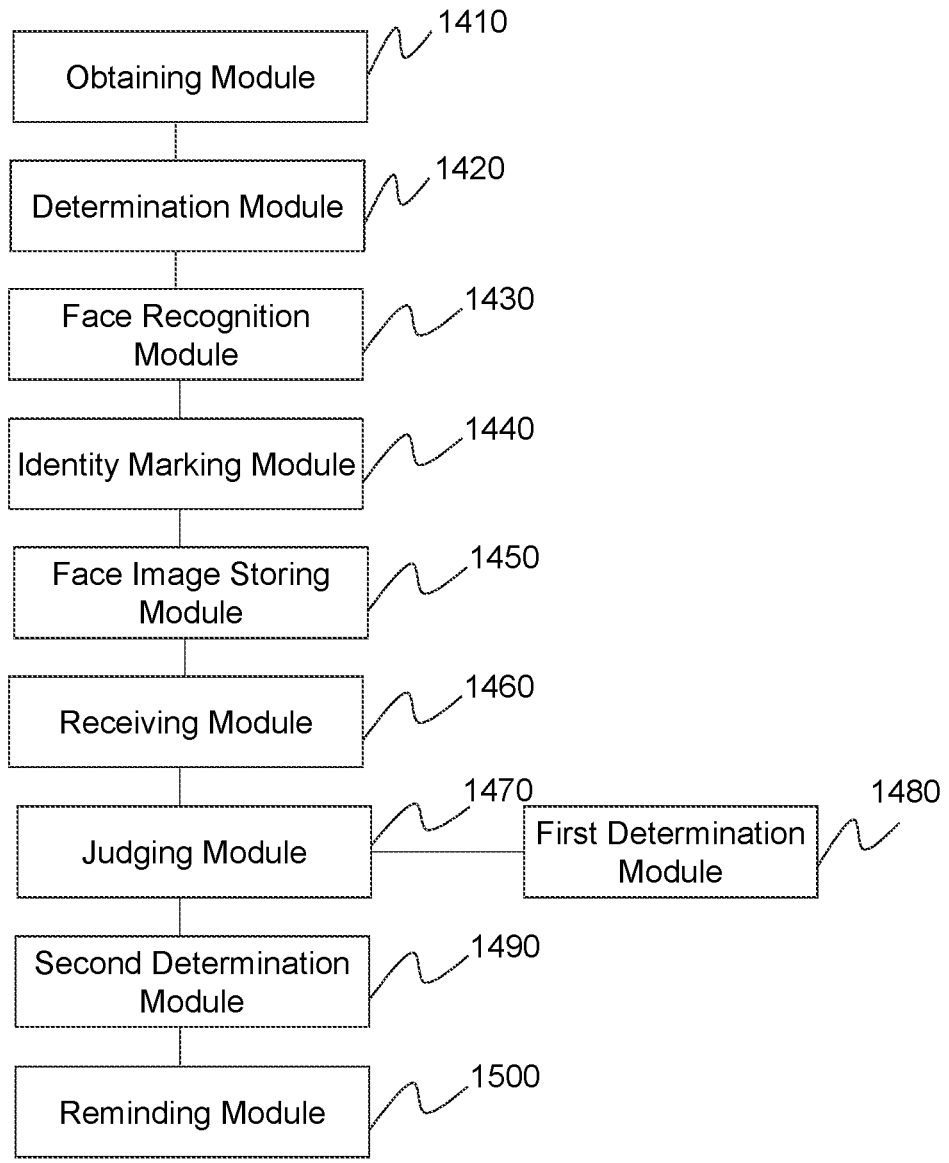
FIG. 14 is a block diagram illustrating a device for marking a user identity attribute of data according to some embodiments of the present disclosure.

FIG. 14 is a block diagram illustrating a device for marking a user identity attribute of data according to some embodiments of the present disclosure. The device may be applied to a server. As shown in FIG. 14, the device may include an obtaining module 1410, a determination module 1420, a face recognition module 1430 and an identity marking module 1440.

The obtaining module 1410 may be configured to obtain door lock data and peephole viewer data associated with a same user identifier.

The door lock data in the embodiment may carry an identity attribute of an unlocker. For example, a fingerprint with an identity attribute, an unlocking password, etc. When the unlocker uses an unlocking key with identity attributes (for example, an unlocking password, a fingerprint with an identity attribute, the smart door lock may recognize the identity of the unlocker, and carry the identity attribute in the door lock data and send the data to the server.

The determination module 1420 may be configured to determine door lock data and peephole viewer data associated with a same unlocking operation.

In an application scenario of the present disclosure, the door lock data or the peephole viewer data may include an association identifier, and the server may find the door lock data and the peephole viewer data associated with the same unlocking operation according to the association identifier. Descriptions about the association identifier may be found in FIG. 6 and relevant descriptions thereof, which will not be repeated herein.

In another application scenario of the present disclosure, the door lock data and the peephole viewer data may not include an association identifier, and the server may find the door lock data and the peephole viewer data associated with the same unlocking operation according to the unlocking time corresponding to the door lock data, and videoing time period of the peephole viewer data. More descriptions of the door lock data and the peephole viewer data associated with the same unlocking operation may be found in FIG. 11 and relevant descriptions thereof, which will not be repeated herein.

The face recognition module 1430 may be configured to recognize a face image included in the peephole viewer data using a face recognition algorithm.

The identity marking module 1440 may be configured to obtain a marked face image by establishing an association relationship between the user identity carried by the door lock data and the face image included in the peephole viewer data associated with the same unlocking operation.

In the door lock data and the peephole viewer data associated with the same unlocking operation, the identity attribute of the unlocker included in the door lock data may be marked on the face image included in the peephole viewer data to obtain the marked face image.

Alternatively, the device may further include a face image storing module 1450, a receiving module 1460, a judging module 1470, a first determination module 1480, a second determination module 1490, and a reminding module 1500.

The face image storing module 1450 may be configured to store the marked face image in the face image library.

The receiving module 1460 may be configured to receive the peephole viewer data of the scene outside the door collected by the smart peephole viewer, and recognize the face image included in the peephole viewer data using a face recognition algorithm.

The judging module 1470 may be configured to judge whether there is a marked face image that matches the face image in the face image library.

The first determination module 1480 may be configured to determine that the identity of the person outside the door is the user identity marked in the marked face image if there is a matching marked face image in the face image library.

The second determination module 1490 may be configured to determine that the person outside the door is a stranger if there is no matching marked face image in the face image library or information returned by the user of "illegal user" is received.

The reminding module 1500 may be configured to send reminder information and the person's face image to a user terminal in response to the determination that the person outside the door is a stranger, and the reminder information may be configured to remind the user that the person outside the door is an illegal user. In some embodiments, if the person outside the door is an illegal user, the reminding module 1500 may notify the property manager or give an alarm.

In the device for marking a user identity attribute of data provided in the embodiment, when the server receives the door lock data generated by the smart door lock carrying the identity attribute of the unlock, the server may receive the peephole viewer data associated with the door lock data sent by the smart peephole viewer at the same time, and the peephole viewer data may carry the identity attribute of the unlocker. Then, the server may combine the identity attribute of the unlocker carried by the door lock data and the face image in the peephole viewer data to automatically mark the face image to obtain the marked face image, which may not require the user to manually add a face image and mark it manually, thereby improving the efficiency of marking face images.

Figure 15:
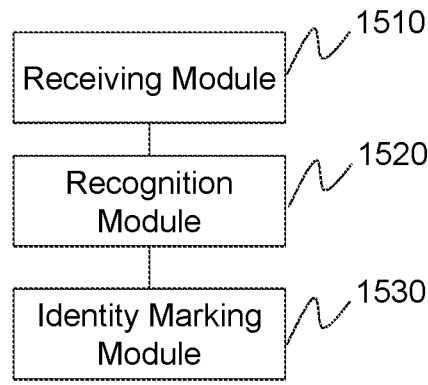
FIG. 15 is a block diagram illustrating another device for marking a user identity attribute of data according to some embodiment of the present disclosure.

FIG. 15 is a block diagram of another device for marking a user identity attribute of data according to some embodiment of the present disclosure. The device may be applied to a server. In the embodiment, when detecting an identity attribute with an unlocker, a smart door lock may send the identity attribute to a smart peephole viewer. The smart peephole viewer may generate peephole viewer data including the identity attribute and send the data to the server, and then the server may mark a face image in the peephole viewer data with the identity attribute carried by the peephole viewer data.

As shown in FIG. 15, the device may include a receiving module 1510, a recognition module 1520, and an identity marking module 1530.

The receiving module 1510 may be configured to receive peephole viewer data sent by a smart peephole viewer.

The peephole viewer data may carry an identity attribute of an unlocker, and the peephole viewer data may be generated after the smart peephole viewer receives a video trigger instruction that is sent by an associated smart door lock and carries the identity attribute of the unlocker.

The recognition module 1520 may be configured to recognize a face image included in the peephole viewer data.

The identity marking module 1530 may be configured to obtain a marked face image by establishing an association relationship between the identity attribute of the unlocker and the face image.

After obtaining the marked face image, the marked face image may be stored in the face image library. When the unlocker appears again, the server may directly recognize the user directly from the video or photo taken by the smart peephole viewer using the face recognition algorithm, thereby automatically recognizing the user identity according to the videos or photos without the user manually establishing recognition data (face photos with identity identifiers).

In the method for marking a user identity attribute of data provided in the embodiment, the user identity obtained by the smart door lock may be sent to the smart peephole viewer, and the smart peephole viewer may upload the user identity and the user's photo or video to the server. The server may perform face recognition on the video uploaded by the smart peephole viewer, and mark the user identity in the recognized face image. In this way, face recognition data may be automatically established, and the user may not need to manually establish the face recognition data, which may reduce the burden on the user.

Some embodiments of the present disclosure may provide a security control method. The processor in the security device 130 may control other access control devices in the security device 130 through the detection signals of one or more access control devices in the security device 130. For example, the processor may control the obtaining of the first data by the first device through the sensing signal obtained by the sensing unit, and control the display unit to be turned on or off based on the sensing unit, thereby realizing the linkage control of the plurality of access control devices in the security device 130. In some embodiments, the user inside the door may also determine whether to switch a state of the second device or take corresponding measures based on the display of the first data by the display unit, thereby ensuring the security of the user within the door. In some alternative embodiments, the above control process may also be implemented by the server 110.

Figure 16:
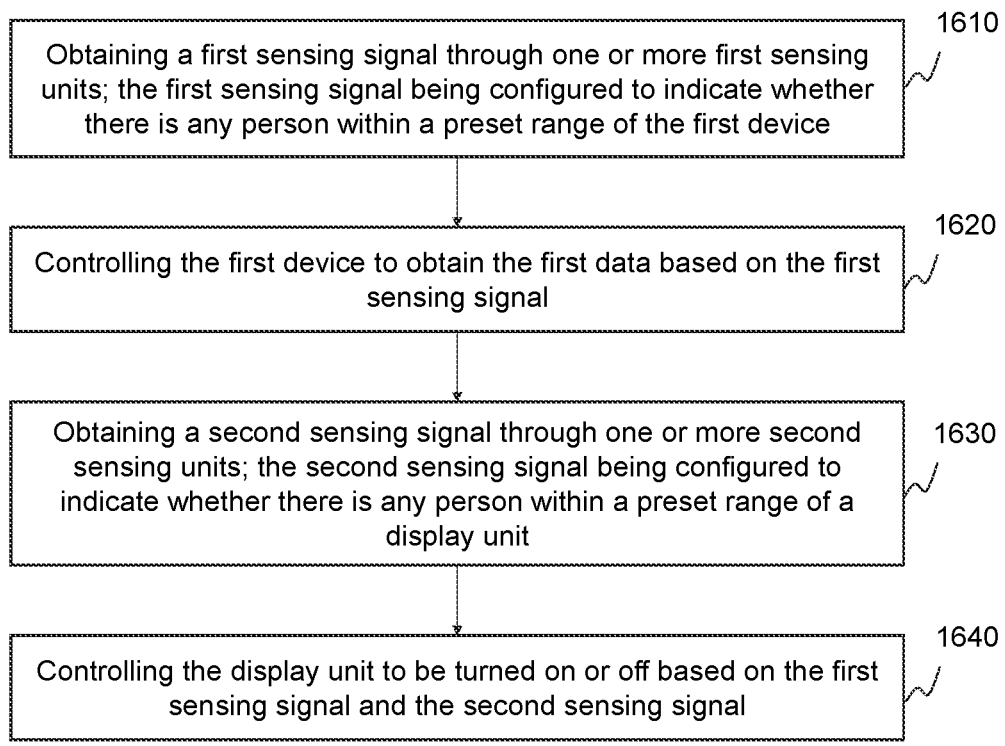
FIG. 16 is a flowchart illustrating a method for controlling a display unit according to some embodiments of the present disclosure.

FIG. 16 is a flowchart illustrating a method for controlling a display unit according to some embodiments of the present disclosure. In some embodiments, one or more operations in the process 1600 may be implemented in the security control system 100 shown in FIG. 1. For example, the one or more operations in the process 1600 may be stored in a storage device in the form of instructions and may be called and/or executed by one or more processors (such as a processor in security device 130).

In 1610, a first sensing signal may be obtained through one or more first sensing units. The first sensing signal may be configured to indicate whether there is any person within a preset range of the first device.

In some embodiments, the first sensing unit may include a sensing device that can sense whether there is any person within the preset range. The preset range may be a range that can be sensed by the sensing device, such as an area within a radius of 2 meters, 5 meters, 10 meters, etc., and with the sensing device as a center. For example, the sensing device may include an image sensor, a passive infrared detector (a body sensor or a PIR detector), an infrared ranging sensor, or the like. In some embodiments, a plurality of first sensing units may be arranged around the first device or at any position away from the first device by a preset distance. In some embodiments, the first sensing signal may include information received or obtained by the first sensing unit. For example, the first sensing signal may include image information sent by the image sensor, and may be used to recognize whether there is any person within the preset range of the first device from the image signal. As another example, the first sensing signal may include a detection signal sent by a passive infrared detector (or a body sensor or a PIR detector), and the detection signal may indicate whether there is any person within the preset range of the first device. In some embodiments, the first device may include a camera, a smart peephole viewer, or the like.

In 1620, the first device may be controlled to obtain the first data based on the first sensing signal.

In some embodiments, the first data may include information collected or obtained by the first device. In some embodiments, if the first sensing signal indicates that there is a person within a preset range of the first device, the system may control the first device to obtain the first data based on the first sensing signal. If the first sensing signal indicates there is no person within the preset range of the first device, the system may control the first device not to turn on the first device or not to obtain the first data based on the first sensing signal.

In 1630, a second sensing signal may be obtained through one or more second sensing units. The second sensing signal may be configured to indicate whether there is any person within a preset range of a display unit.

In some embodiments, the second sensing unit may include a sensing device that can sense whether there is any person within the preset range. For example, the sensing device may include an image sensor, a passive infrared detector (a body sensor or a PIR detector), an infrared ranging sensor, or the like. In some embodiments, a plurality of second sensing units may be arranged around the display unit or at any position away from the display unit by a preset distance. In some embodiments, the second sensing signal may include information received or obtained by the second sensing unit. For example, the second sensing signal may include image information sent by the image sensor, and may be used to recognize whether there is any person within the preset range of the display unit from the image signal. As another example, the second sensing signal may include a detection signal sent by an infrared ranging sensor, and the detection signal may indicate whether there is any person within the preset range of the display unit. In some embodiments, the display unit may include a display screen, or the like.

In 1640, the display unit may be controlled to be turned on or off based on the first sensing signal and the second sensing signal.

In some embodiments, the first data may be displayed when the display unit is turned on. For example, if the first sensing signal indicates that there is a person within the preset range of the first device, and the second sensing signal indicates that there is a person within the preset range of the display unit, the display unit may be controlled to be turned on, and the display unit may display the first data obtained by the first device. If the first sensing signal indicates that there is a person within the preset range of the first device outside the door and the second sensing signal indicates that there is a person within the preset range of the display unit inside the door, the display unit inside the door may be controlled to be turned on, and the display unit inside the door may display the first data obtained by the first device outside the door, so that the user inside the door may know the real-time situation outside the door. In some embodiments, if the first sensing signal indicates that there is a person within the preset range of the first device, but the second sensing signal indicates that there is no person within the preset range of the display unit, the display unit may be controlled to be turned off, which may avoid the waste of energy when the display unit is turned on without any person, and may effectively improve the endurance of the security control system.

It should be noted that the above description regarding process 1600 is merely provided for the purposes of illustration, and not intended to limit the scope of the present disclosure. For those skilled in the art, multiple variations and modifications may be made for the process 1600 under the teachings of the present disclosure. However, those variations and modifications do not depart from the scope of the present disclosure.

Figure 17:
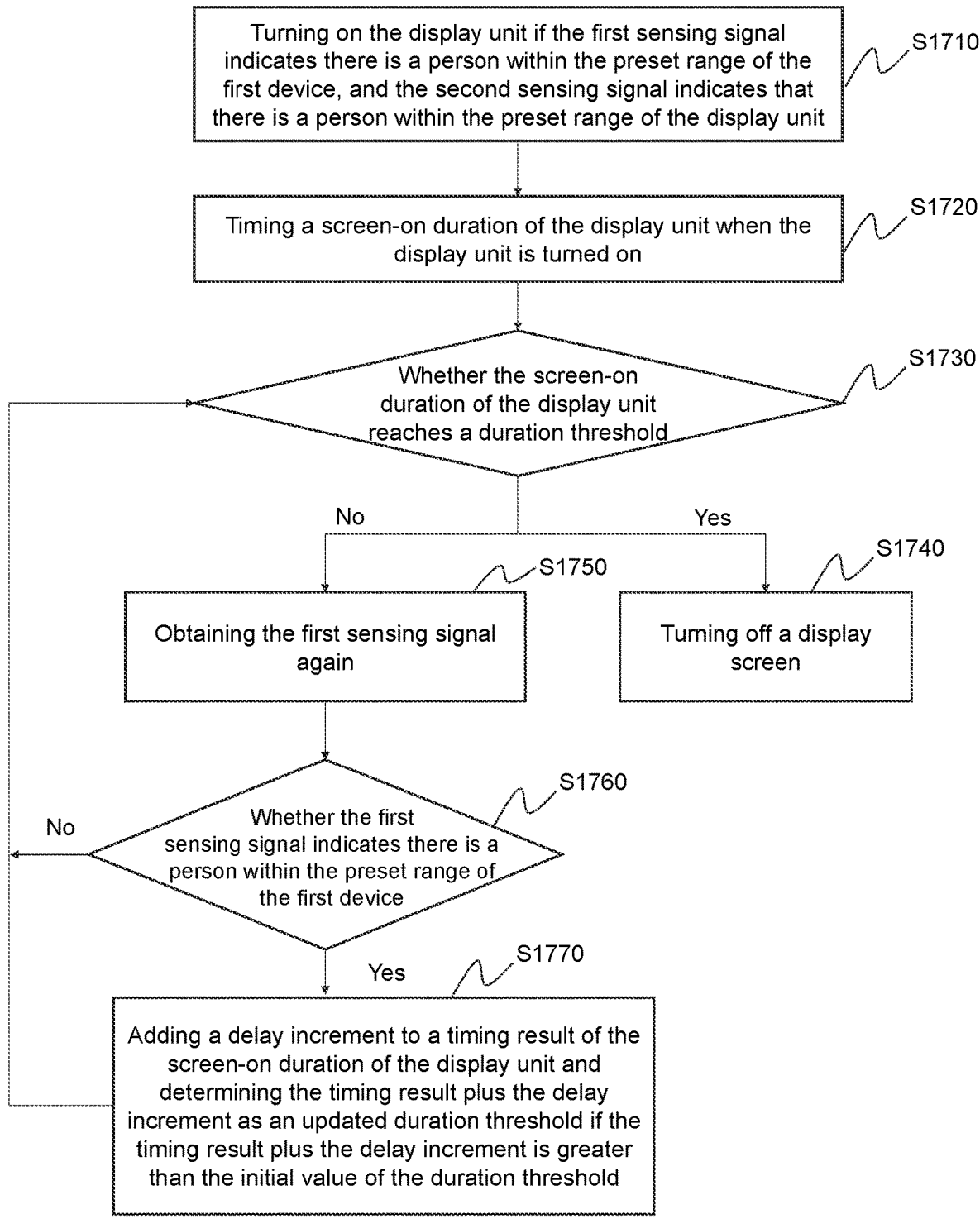
FIG. 17 is a flowchart illustrating an exemplary process for controlling a screen-on duration of a display unit according to some embodiments of the present disclosure.

FIG. 17 is a flowchart illustrating an exemplary process for controlling a screen-on duration of a display unit according to some embodiments of the present disclosure. In some embodiments, one or more operations in the process 1700 may be implemented in the security control system 100 shown in FIG. 1. For example, the one or more operations in the process 1700 may be stored in a storage device in the form of instructions and may be called and/or executed by one or more processors.

In 1710, the display unit may be turned on if the first sensing signal indicates there is a person within the preset range of the first device, and the second sensing signal indicates that there is a person within the preset range of the display unit. More descriptions of this operation may be found in operation 1640 of the present disclosure, and which will not be repeated herein.

In 1720, a screen-on duration of the display unit may be timed when the display unit is turned on.

In some embodiments, the security control system may further include a timer. The timer may be communicatively connected with the display unit. The timer may be configured to time the screen-on duration of the display unit. For example, the processor may control the timer to start to time when the display unit is turned on. The processor may control the timer to stop timing when the display unit is turned off. The timing of the timer may represent the screen-on duration of the display unit.

In 1730, it may be determined whether the screen-on duration of the display unit reaches a duration threshold. If so, operation 1740 may be performed. If not, operation 1750 may be performed.

In some embodiments, the duration threshold may have an initial value, and the duration threshold may be dynamically set. An initial value of the duration threshold may be a preset duration, which may be set as a seconds, and a may be 8, 10, or the like. If the preset conditions are met, the duration threshold may be dynamically set. More descriptions of the duration threshold may be found in operation 1770 of the present disclosure, which will not be repeated herein.

In 1740, the display unit may be turned off.

For example, if the display unit is in a screen-on state and the screen-on duration reaches a duration threshold, the controller may control the display unit to be turned off.

In 1750, the first sensing signal may be obtained again.

If the screen-on duration of the display unit does not reach a duration threshold, the system may obtain the first sensing signal again.

In 1760, it may be determined whether the first sensing signal indicates there is a person within the preset range of the first device. If so, operation 1770 may be performed. If not, operation 1730 may be performed. Descriptions about the first sensing signal indicating that there is any person within the preset range of the first device may be found in operation 1610 of the present disclosure, which will not be repeated herein.

In 1770, a delay increment may be added to a timing result of the screen-on duration of the display unit and the timing result plus the delay increment may be determined as an updated duration threshold if the timing result plus the delay increment is greater than the initial value of the duration threshold.

In some embodiments, the delay increment may be any duration. For example, the delay increment may include 1 second, 2 seconds, 3 seconds, 4 seconds, 5 seconds, 6 seconds, 7 seconds, 8 seconds, etc. The delay increment will not be limited in the present disclosure. The delay increment may be described as c seconds in the present disclosure. For example, the initial value of the duration threshold is a second, and the delay increment is c seconds. If the first sensing signal obtained again indicates that there is any person within the preset range of the first device, the current screen-on duration of the display unit may be b seconds (b<a). In such cases, the delay increment (c seconds) may be added to the current screen-on duration (b seconds) of the display unit to obtain the updated duration threshold (b+c seconds). If (b+c) is less than a, the duration threshold may still be a. If (b+c) is greater than a, (b+c) may be used as the duration threshold. Therefore, if the screen-on duration reaches a certain value, the duration threshold may be dynamically updated. It may be determined again whether the screen-on duration of the display unit reaches the duration threshold. If so, operation 1740 may be performed. If not, operations 1750, 1760 and 1770 may be repeated. An appropriate screen-on duration may be ensured when the duration threshold is dynamically set, which may be beneficial for users inside the door to observe the outdoor condition through the display unit, and may save the energy consumption of the display unit.

It should be noted that the above description regarding process 1700 is merely provided for the purposes of illustration, and not intended to limit the scope of the present disclosure. For those skilled in the art, multiple variations and modifications may be made for the process 1700 under the teachings of the present disclosure. However, those variations and modifications do not depart from the scope of the present disclosure.

Figure 18:
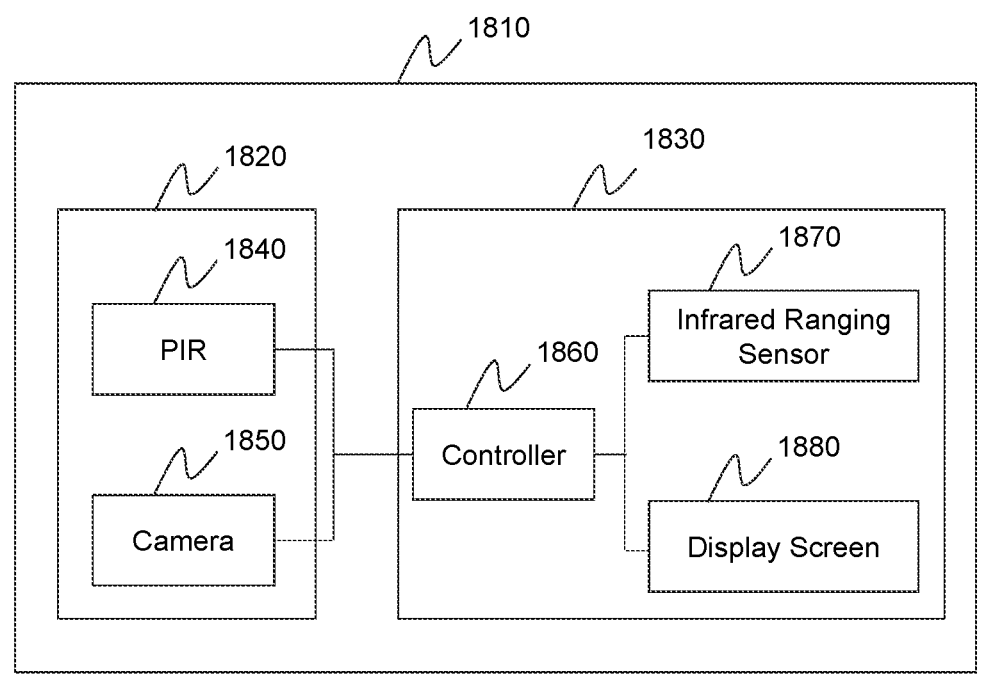
FIG. 18 is a structural diagram illustrating a monitoring system according to some embodiments of the present disclosure.

FIG. 18 is a structural diagram illustrating a monitoring system according to some embodiments of the present disclosure.

The monitoring system may include a monitoring device 1810 including a slave machine 1820 installed outside a door and a master machine 1830 installed inside the door. Specifically, the slave machine 1820 outside the door may be installed at a peephole viewer hole.

The slave machine 1820 and the master machine 1830 may be connected through wired communication or wireless communication. In some embodiments, the slave machine 1820 and the master machine 1830 may be electrically connected through a flat cable. The slave machine 1820 may include a passive infrared sensor (e.g., a pyroelectric infrared sensor) PIR1840 and a camera 1850. The PIR1840 may be configured to detect whether there is any person outside the door, and when a person is detected, the PIR1840 may be triggered, and the PIR1840 may send a signal to a controller 1860 after being triggered. The PIR1840 and the camera 1850 may be independently arranged outside the door in the slave machine 1820. The slave machine 1820 may further include a mounting base, and the mounting base, the PIR1840, and the camera 1850 may be an integrated injection molding structure. For example, the housings of the PIR 1840 and the camera 1850 may be installed on the mounting base of the slave machine 1820 by injection molding.

The master machine 1830 inside the door may include a controller 1860, at least one infrared ranging sensor 1870, and a display screen 1880.

The controller 1860 may be connected to the PIR 1840, the camera 1850, the infrared ranging sensor 1870, and the display screen respectively through the flat cable.

In some embodiments, the master machine 1830 may include a plurality of infrared ranging sensors 1870, and the plurality of infrared ranging sensors 1870 may be arranged around the display screen 1880, respectively. In some embodiments, the master machine 1830 may be provided with a plurality of infrared ranging sensors 1870 to increase a detection range. In a specific embodiment, the master machine 1830 may include four infrared ranging sensors 1870, and the four infrared ranging sensors 1870 may be arranged around the display screen 1880 in the front of the master machine 1830, respectively. In another embodiment, the master machine 1830 may include two infrared ranging sensors 1870, and the two infrared ranging sensors 1870 may be arranged on the left and right sides of the display screen 1880 in the front of the master machine 1830, respectively. A count of infrared ranging sensors 1870 will not be limited in embodiments of the present disclosure.

The infrared ranging sensor 1870 may be an integrated infrared ranging sensor or a split infrared ranging sensor. The infrared emission unit and the receiving unit may be separately arranged in the split infrared ranging sensor while the infrared emission unit and the receiving unit may be integrated in the integrated infrared ranging sensor.

If the controller 1860 detects that the PIR 1840 is triggered, the controller 1860 may turn on the camera 1850 to start to record video data, and turn on the infrared ranging sensor 1870 at the same time to detect whether there is any person within the preset range inside the door. In some embodiments, the master machine 1830 may also be provided with a timer for timing the screen-on duration of the display screen 1880.

In some embodiments, with respect to the door panel, the infrared ranging sensor 1870 and the display screen 1880 may be on a same plane.

The infrared ranging sensor 1870 may determine whether there is any person within the preset range inside the door, and the preset range may be set in advance, such as a range of 50 cm from the display screen. If the infrared ranging sensor 1870 detects a person within the preset range, the infrared ranging sensor 1870 may send a signal to the controller 1860. In the embodiment of the present disclosure, the preset range may not be limited to 50 cm. In some embodiments, the preset range may have other values, such as 100 cm, 90 cm, 80 cm, 70 cm, 60 cm, 50 cm, 40 cm, 30 cm, 20 cm, 10 cm, or the like.

The controller 1860 may determine whether to turn on the display screen 1880 by the signal sent by the infrared ranging sensor 1870. Specifically, in response to a determination that there is any person outside the door and there is any person inside the door, and the display screen 1880 of the monitoring device is turned off, then the display screen 1880 may be turned on, and may display real-time videos collected by the camera, wherein the display screen 1880 may be in a screen-on state after being turned on.

Optionally, the master machine 1830 may be provided with a wake-up button of the display screen 1880, and the user may wake up the display screen 1880 by pressing the display screen wake-up button to make the display screen 1880 switch to the screen-on state.

The display screen 1880 may be a touch screen. If the display screen 1880 is a touch screen, the wake-up button of the display screen 1580 may be provided on the panel of the external surface of the display screen 1880.

In the monitoring system disclosed in this embodiment, the slave machine including the PIR and the camera may be installed outside the door, and the master machine including the controller, the infrared ranging sensor, and the display screen may be installed inside the door. When the monitoring device detects that the PIR is triggered, the camera installed outside the door may be turned on to record video data, and it may be determined whether there is any person within the preset range inside the door. Only when there is a person inside the door and a person outside the door, the display screen may be turned on, which may solve the problem that in the prior art additional power consumption increases since the display screen automatically lights up when there is someone outside the door but there is no person inside the door, and improve the overall endurance of the monitoring device.

As a preferred embodiment, white light lamps may be embedded on both sides of the camera 1850, an infrared lamp may be embedded above the camera, and a photosensitive sensor may be embedded below the camera. The white light lamps, the infrared light and the photosensitive sensor may be communicatively connected with the controller respectively.

The slave machine 1820 may include a mounting base. The PIR 1840, the camera 1850, the white light lamps, the infrared lamp, and the photosensitive sensor may be arranged on the mounting base. The mounting base, the PIR 1840, the camera 1850, the white light lamps, the infrared lamp, and the photosensor may be an integrated injection molding structure. In some embodiments, the housing of the PIR 1840, the camera 1850, the white light lamps, the infrared lamp, and the photosensitive sensor may be installed on the mounting base of the slave machine 1820 by injection molding.

The white light lamp may play a role of strong light auxiliary illumination, and the infrared lamp may be turned on in a low light condition, and play a role of assisting the camera in illuminating and imaging. The photosensitive sensor may sense the intensity of the peripheral ambient light. If weak light is detected, the infrared lamp may be turn on in linkage. If the infrared lamp is turned on, and the PIR 1840 detects human activity, the white light lamps may be turned on in linkage. After the human body leaves, the white light lamp may be turned off, and the infrared light may be turned on. The dual-light source combination of infrared lamp and white light lamps can realize covert monitoring under normal circumstances, and turn on the white light lamp after human activity is detected to achieve color images at night.

Figure 19:
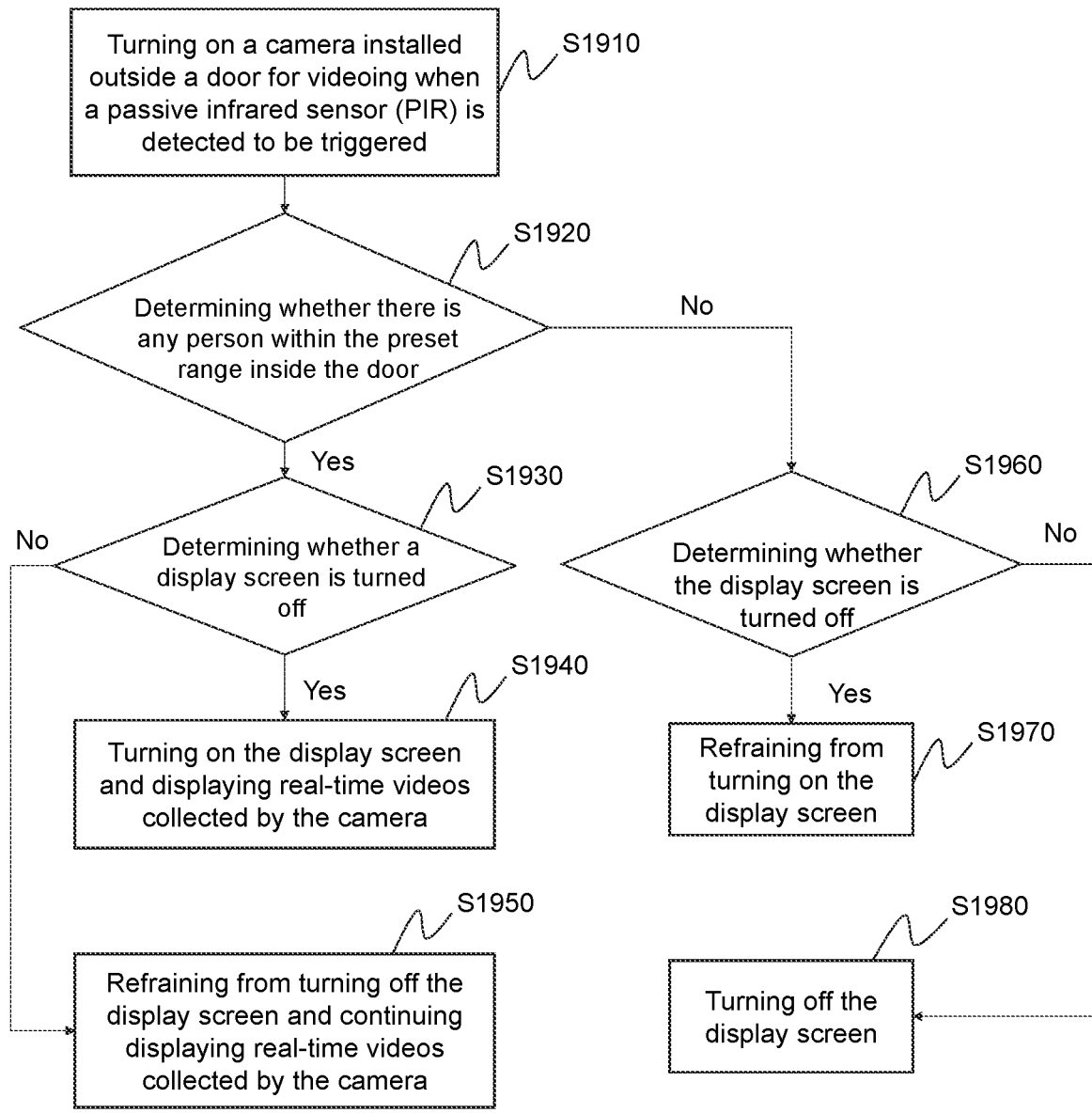
FIG. 19 is a flowchart illustrating a process for screen controlling of a monitoring device according to some embodiments of the present disclosure.

FIG. 19 is a flowchart illustrating a process for screen controlling of a monitoring device according to some embodiments of the present disclosure. The monitoring device applied to the monitoring system disclosed above, may be specifically a controller in the monitoring device. The method may include one or more of the following operations.

In S1910, a camera installed outside a door may be turned on for videoing when a passive infrared sensor (PIR) is detected to be triggered.

If there is any person outside the door, the PIR may be triggered, and the controller may turn on the camera outside the door when detecting that the PIR is triggered.

In S1920, it may be determined whether there is any person within the preset range inside the door.

Specifically, it may be determined whether there is any person within a preset range inside the door through the infrared ranging sensor installed inside the door. The preset range may be set in advance, such as a range of 50 cm from the display screen. In the embodiment of the present disclosure, the preset range may not be limited to 50 cm. In some embodiments, the preset range may have other values, such as 100 cm, 90 cm, 80 cm, 70 cm, 60 cm, 50 cm, 40 cm, 30 cm, 20 cm, 10 cm, or the like.

If the PIR is triggered and the infrared ranging sensor determines that there is a person within the preset range inside the door, that is, there is someone outside the door and someone inside the door, the display screen may be turned on automatically. Specifically, S1930 and S1940 may be performed.

If there is a person inside the door, S1930 may be performed. That is, it may be determined whether a display screen is turned off.

If the display screen is turned off, S1940 may be performed. That is, the display screen may be turned on and real-time videos collected by the camera may be displayed.

If the display screen is not turned off, that is, the display screen is in a screen-on state, S1950 may be performed. That is, the display screen may be refrained from turning off and real-time videos collected by the camera may be displayed.

If there is no person inside the door, S1960 may be performed. That is, it may be determined whether the display screen is turned off.

If the display screen is turned off, S1970 may be performed. That is, the display screen may be refrained from turning on.

If the display screen is not turned off, that is, the display screen is in a screen-on state, S1980 may be performed. That is, the display screen may be turned off.

It should be noted that when the display screen is in a screen-on state, the camera may continue recording video data. If the PIR is triggered, but the display screen is turned off, it may be recorded according to the camera recording strategy. In some embodiments, the camera recording strategy may include a recording start condition set for the camera in advance by the monitoring system. For example, if the PIR is triggered, the PIR may send a signal to the controller, and the controller may control the camera to start recording. In some alternative embodiments, the PIR may also directly give an instruction to the camera to notify the camera to start recording when being triggered. In some embodiments, the camera recording strategy may include the pre-setting of the recording time by the monitoring system. For example, after detecting that the PIR trigger is triggered, the camera may start to work. The shortest recording duration may be 10 seconds. If the PIR is triggered again, the recording duration may be increased by 5 seconds on the basis of the last PIR being triggered to ensure that the recording will be continued when there is someone outside the door. In some embodiments, the camera recording strategy may also include a pre-setting of the total duration of a single recording file by the monitoring system. For example, a maximum duration of a single recording file may be no more than 200 seconds. In some embodiments, the recording duration of the camera may be greater than or equal to the screen-on duration of the display screen.

If there is a person inside the door and there is a person outside the door and if the display screen is turned off, the display screen may be turned on. If the display screen is in a screen-on state, real-time videos collected by the camera may be displayed. If there is a person outside the door but there is no person inside the door and if the display screen is turned off, the display screen may be refrained from turning on. If the display screen is in a screen-on state, the display screen may be turned off to avoid unnecessary power consumption, which may improve the overall endurance of the monitoring device.

The method for screen controlling of a monitoring device disclosed in the present disclosure can turn on the display screen when there is a person outside the door and there is a person inside the door, and automatically turn off the display screen when there is no person inside the door, and may automatically adjust the screen-on duration according to the activities of the person outside the door, which may improve the overall endurance of the monitoring device.

Figure 20:
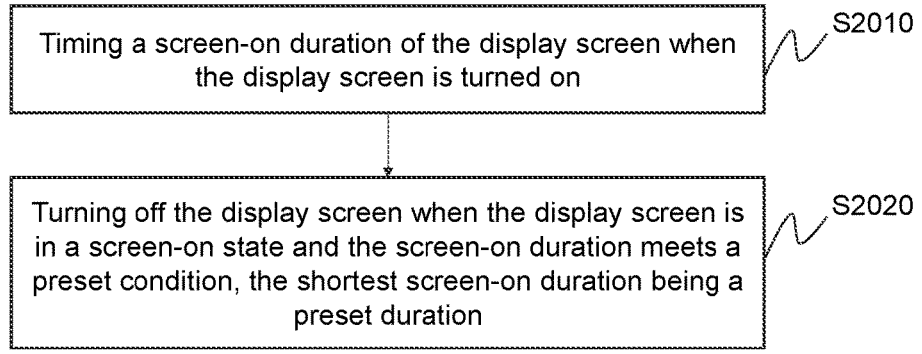
FIG. 20 is a flowchart illustrating another process for screen controlling of a monitoring device according to some embodiments of the present disclosure.

On this basis, FIG. 20 is a flowchart illustrating another process for screen controlling of a monitoring device according to some embodiments of the present disclosure. Specifically, the method may include one or more of the following operations.

In S2010, a screen-on duration of the display screen may be timed when the display screen is turned on.

In S2020, the display screen may be turned off when the display screen is in a screen-on state and the screen-on duration meets a preset condition. In some embodiments, the shortest screen-on duration may be a preset duration. In some embodiments of the present disclosure, the preset duration may be a preset screen-on duration, such as 8 seconds. In other embodiments of the present disclosure, the preset duration may not be limited to 8 seconds. By setting the preset duration, the screen-on duration of the display screen may be at least the preset duration. More descriptions of the controlling of the display screen to be turned off using the controller when the screen-on duration meets the preset condition may be found in FIG. 21, FIG. 22, FIG. 23 and relevant descriptions thereof, which will not be repeated herein.

Figure 21:
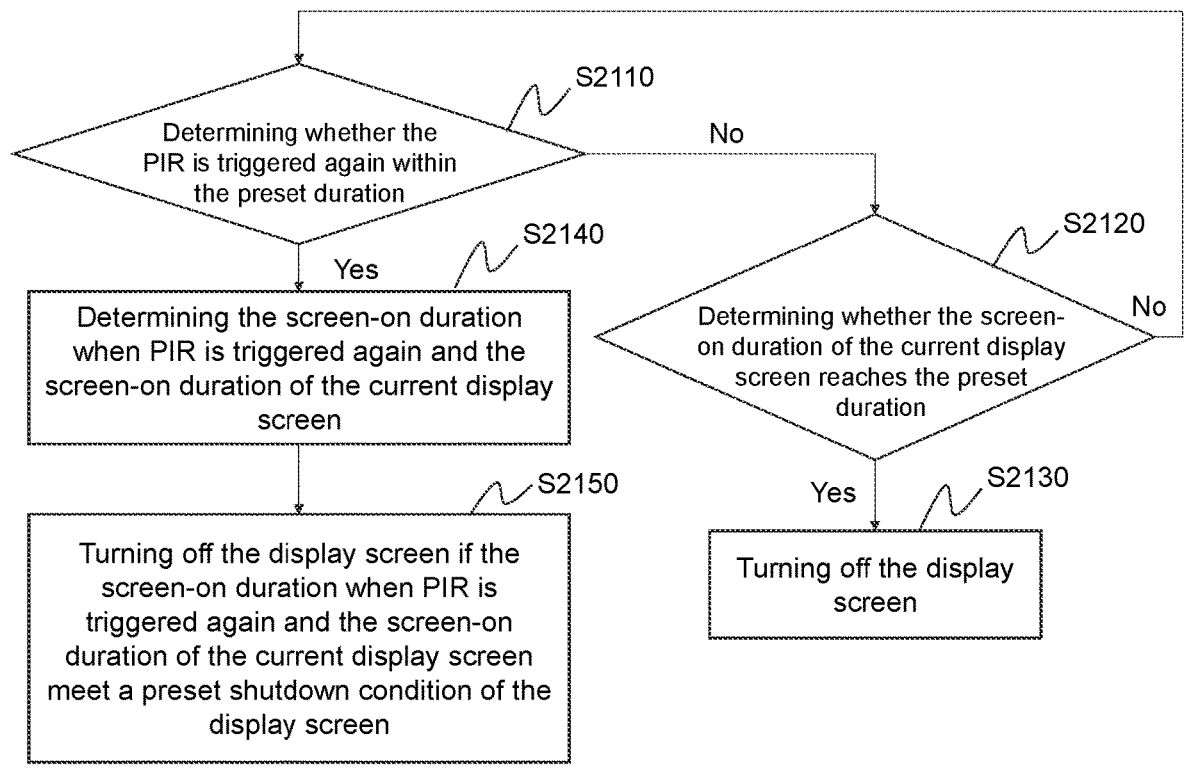
FIG. 21 is a flowchart illustrating a process for turning off the display screen in a screen-on state according to some embodiments of the present disclosure.

Optionally, FIG. 21 is a flowchart illustrating a process for turning off the display screen in a screen-on state according to some embodiments of the present disclosure. The method may include one or more of the following operations.

If the display screen is in a screen-on state, in S2110, it may be determined whether the PIR is triggered again within the preset duration.

If the PIR is not triggered again, in S2120, it may be determined whether the screen-on duration of the current display screen reaches the preset duration. More descriptions about the preset duration may be found in FIG. 20 and relevant descriptions thereof.

If the screen-on duration of the current display screen reaches the preset duration, in S2130, the display screen may be turned off.

If the screen-on duration of the current display screen does not reach the preset duration, S2110 may be performed.

If the PIR is triggered again, in S2140, the screen-on duration when PIR is triggered again and the screen-on duration of the current display screen may be determined.

In S2150, the display screen may be turned off if the screen-on duration when PIR is triggered again and the screen-on duration of the current display screen meet a preset shutdown condition of the display screen. More descriptions about turning off the display screen when the preset shutdown condition of the display screen is met may be found in FIG. 22, FIG. 23 and the relevant descriptions thereof, which will not be repeated herein.

Figure 22:
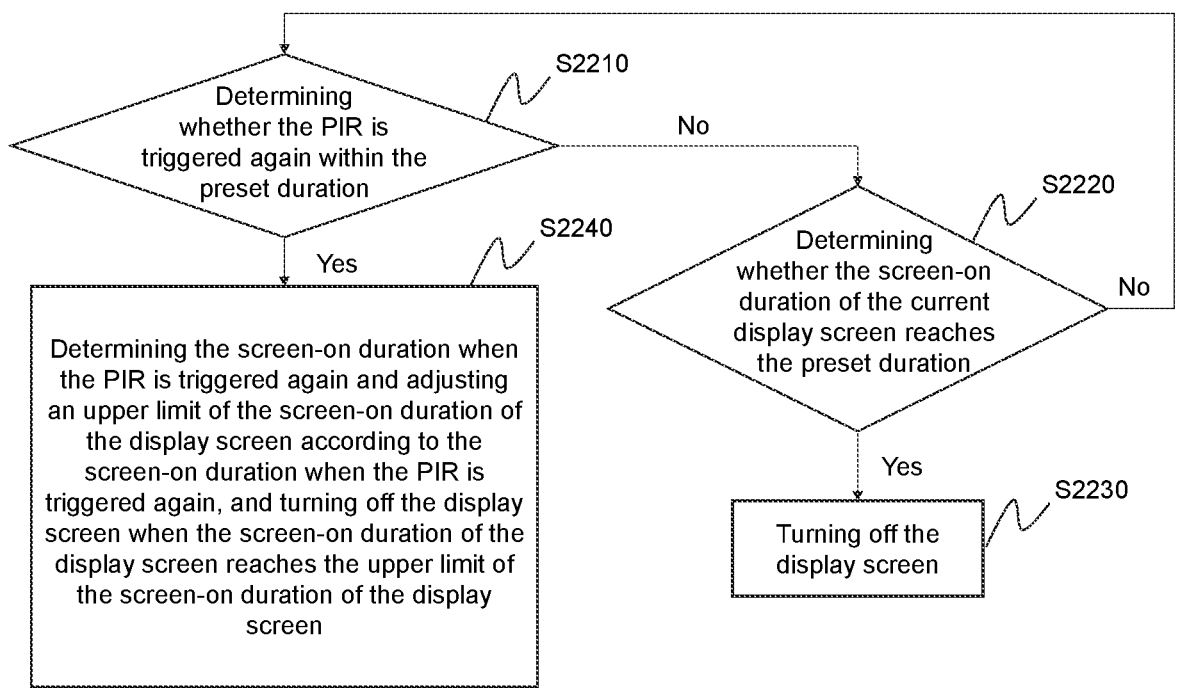
FIG. 22 is a flowchart illustrating another process for turning off the display screen in a screen-on state according to some embodiments of the present disclosure.
Figure 23:
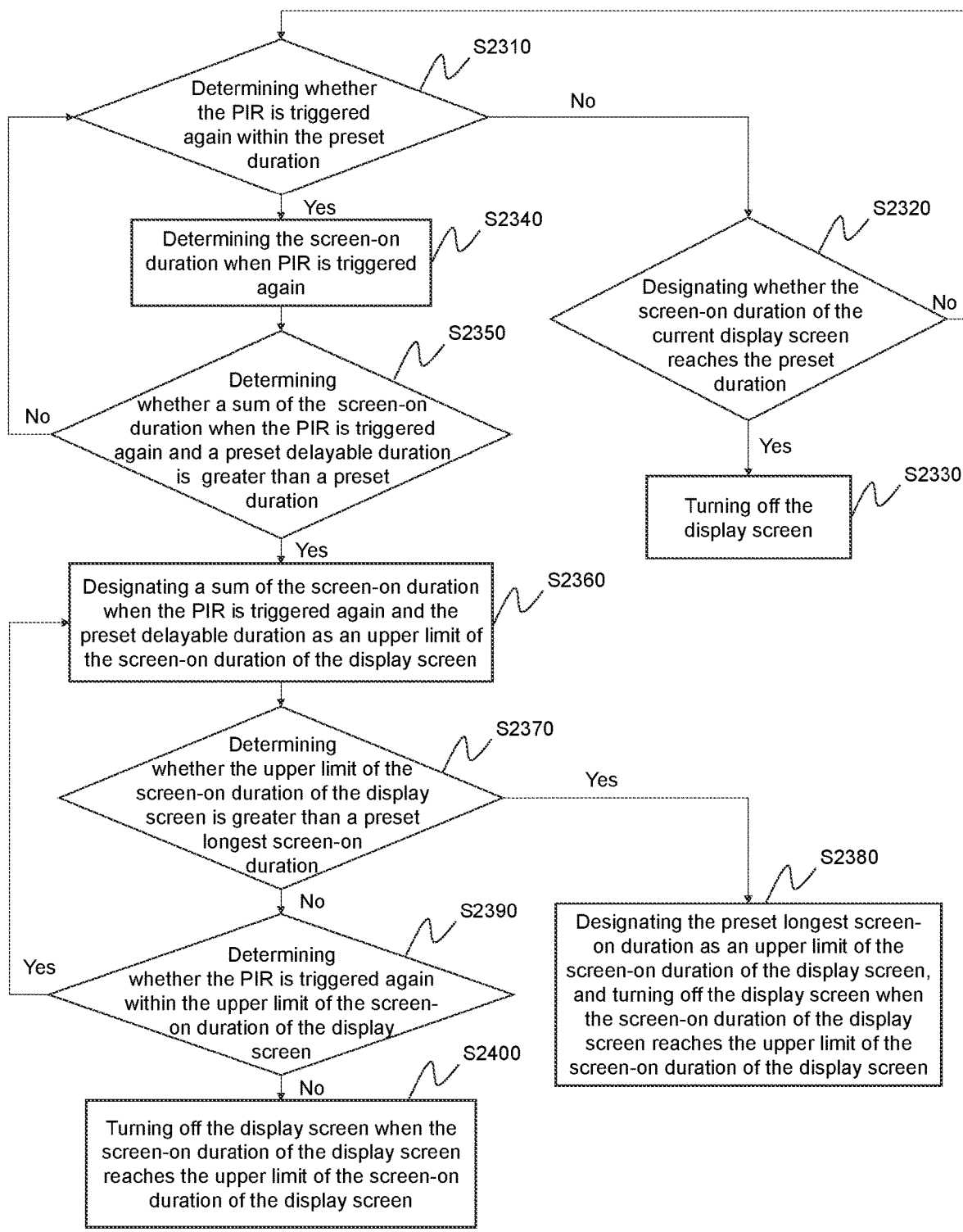
FIG. 23 is a flowchart illustrating still another process for turning off the display screen in a screen-on state according to some embodiments of the present disclosure.

Specifically, further descriptions on how to determine whether the preset display screen shutdown condition is met may be found in FIG. 22 and FIG. 23. FIG. 22 is a flowchart illustrating another process for turning off the display screen in a screen-on state according to some embodiments of the present disclosure. The method may include one or more of the following operations.

In S2210, it may be determined whether the PIR is triggered again within the preset duration when the display screen in a screen-on state.

If the PIR is not triggered again, in S2220, it may be determined whether the screen-on duration of the current display screen reaches the preset duration.

If the screen-on duration of the current display screen reaches the preset duration, in S2230, the display screen may be turned off.

If the screen-on duration of the current display screen does not reach the preset duration, S2210 may be performed.

If the PIR is triggered again, in S2240, the screen-on duration may be determined when the PIR is triggered again and an upper limit of the screen-on duration of the display screen may be adjusted according to the screen-on duration when the PIR is triggered again, and the display screen may be turned off when the screen-on duration of the display screen reaches the upper limit of the screen-on duration of the display screen. More descriptions about adjusting the screen-on duration of the display screen may be found in FIG. 23 and relevant descriptions thereof, which will not be repeated herein.

It should be noted that the PIR being triggered again indicates that there is a person outside the door. In order to ensure that the display screen is always in a screen-on state when there is a person outside the door and there is a person inside the door, a sum of the screen-on duration when the PIR is triggered again and a preset delayable duration may be introduced in the method for screen controlling of a monitoring device.

On this basis, the specific execution method for determining whether the preset display screen shutdown condition is met may be found in FIG. 23.

In S2310, when the display screen is in a screen-on state, it may be determined whether the PIR is triggered again within the preset duration. More descriptions about the preset duration may be found in FIG. 20 and relevant descriptions thereof, which will not be repeated herein.

If the PIR is not triggered again, in S2320, it may be designated whether the screen-on duration of the current display screen reaches the preset duration.

If the screen-on duration of the current display screen reaches the preset duration (e.g., 8 seconds), in S2330, the display screen may be turned off.

If the screen-on duration of the current display screen does not reach the preset duration, S2310 may be performed.

If the PIR is triggered again, in S2340, the screen-on duration may be determined when PIR is triggered again. The screen-on duration when PIR is triggered again may be the screen-on duration of the display screen when the PIR is triggered again. The screen-on duration of the display screen may be obtained by a timer.

In S2350, it may be determined whether a sum of the screen-on duration when the PIR is triggered again and a preset delayable duration is greater than a preset duration. In some embodiments, the preset delayable duration may be the screen-on duration that needs to be delayed every time the PIR is triggered, and the preset delayable duration may be set in advance by the system, such as 5 seconds.

If a sum of the screen-on duration when the PIR is triggered again and a preset delayable duration is smaller than or equal to a preset duration, S2310 may be performed.

If a sum of the screen-on duration when the PIR is triggered again and a preset delayable duration is greater than a preset duration, in S2360, a sum of the screen-on duration when the PIR is triggered again and the preset delayable duration may be designated as an upper limit of the screen-on duration of the display screen. In some embodiments, the upper limit of the screen-on duration of the display screen may limit the total screen-on duration of the display screen. The upper limit of the screen-on duration of the display screen may be not a fixed value, and the upper limit of the screen-on duration of the display screen may be calculated according to whether the PIR is triggered again. In some embodiments, the upper limit of the screen-on duration of the display screen may be the sum of the upper limit of the screen-on duration of the display screen before the PIR is triggered again and the preset delayable duration, that is, a sum of the previous upper limit of the screen-on duration of the display screen and the preset delayable duration.

When the PIR is triggered again, the screen-on duration of the display screen may be delayed to ensure that the display is always in a screen-on state when there is a person outside the door and there is a person inside the door. Specifically, the delayed screen-on duration of the display screen may be preset when the PIR is triggered again, that is, a delayable duration may be preset, for example, a duration of 5 seconds may be preset. The preset delayable duration may not be limited in the embodiments of the present disclosure. In some embodiments, the preset delayable duration may be any duration. For example, 2 seconds, 3 seconds, 4 seconds, 6 seconds, 7 seconds, 8 seconds, etc. It is understood that as the display screen is triggered again when the display screen is in a screen-on state, the upper limit of the screen-on duration of the display screen may be dynamically updated.

If the sum of the screen-on duration when the PIR is triggered again (a screen-on duration of the display screen obtained by a timer) and the preset delayable duration is smaller than the preset duration, the preset duration may be designated as the upper limit of the screen-on duration of the display screen. The sum of the screen-on duration when the PIR is triggered again and the preset delayable duration is greater than the preset duration, the sum of the screen-on duration when the PIR is triggered again and the preset delayable duration may be designated as the upper limit of the screen-on duration of the display screen. For example, the preset delayable duration may be set as 5 seconds, and the preset duration may be 8 seconds. The screen-on duration (obtained by the timer) when the PIR is triggered again may be 2 seconds. The sum of the screen-on duration (2 seconds) when the PIR is triggered again and the preset delayable duration (5 seconds) may be smaller than the preset duration (8 seconds). In such cases, the preset duration (8 seconds) may be designated as the upper limit of the screen-on duration of the display screen. As another example, the preset delayable duration may be set as 5 seconds, and the preset duration may be 8 seconds. The screen-on duration when the PIR is triggered again may be (4 seconds). The sum (9 seconds) of the screen-on duration when the PIR is triggered again and the preset delayable duration may be greater than the preset duration (8 seconds). In such cases, the sum (9 seconds) of the screen-on duration when the PIR is triggered again and the preset delayable duration may be designated as the upper limit of the screen-on duration of the display screen.

If there is always a person outside the door and there is always a person inside the door, the PIR may be continuously triggered multiple times. After the screen-on duration of the display screen exceeds the preset duration, the upper limit of the screen-on duration of the display screen may be dynamically updated and increased to ensure that the user inside the door can continuously view the real-time dynamic condition outside the door.

In S2370, it may be determined whether the upper limit of the screen-on duration of the display screen is greater than a preset longest screen-on duration.

The preset longest screen-on duration may indicate the longest duration that the display screen is in a screen-on state.

It is understood that the too long continuous screen-on duration of the display screen will cause waste of unnecessary power consumption. In order to solve this technical problem and improve the overall endurance of the monitoring device, the longest duration that the display screen is in a screen-on state may be preset, such as 30 minutes, which may ensure that the display screen is always in a screen-on state to a certain extent when there is a person outside the door and there is a person inside the door without causing unnecessary waste of power consumption. In order to improve the overall endurance of the monitoring device, when the screen-on duration lasts too long, and the user inside the door does not take any measure (for example, opening the door), it is not necessary to keep the display screen in a screen-on state. Therefore, when there is a person outside the door and there is a person inside the door, the display screen may be turned off when the screen-on duration of the display screen reaches the longest screen-on duration. The longest duration that the display screen is in the screen-on state, i.e., the preset longest screen-on duration may be set before the monitoring device is delivered from the factory, or may be personalized by users in advance according to their own needs.

If the upper limit of the screen-on duration of the display screen is greater than the preset longest screen-on duration, in S2380, the preset longest screen-on duration may be designated as an upper limit of the screen-on duration of the display screen, and the display screen may be turned off when the screen-on duration of the display screen reaches the upper limit of the screen-on duration of the display screen.

If the upper limit of the screen-on duration of the display screen is smaller than or equal to the preset longest screen-on duration, in S2390, it may be determined whether the PIR is triggered again within the upper limit of the screen-on duration of the display screen.

If the PIR is not triggered again, in S2400, the display screen may be turned off when the screen-on duration of the display screen reaches the upper limit of the screen-on duration of the display screen.

If the PIR is triggered again, S2360 may be performed.

In order to facilitate understanding and further explanation of the above method, the following embodiments will be described below.

For example, in the method for screen controlling of a monitoring device disclosed in the embodiment, the preset duration may be 8 seconds, the preset delayable duration may be 5 seconds, and the preset longest screen-on duration may be 30 minutes. On this basis, when the display screen is turned off, the display screen may be turned on when the monitoring device detects that the PIR is triggered and there is a person within the preset range inside the door, and the display screen may be in the screen-on state. In such cases, the screen-on duration of the display screen may be timed.

If the PIR is not triggered again within the preset duration of 8 seconds, the display screen may be turned off when the screen-on duration of the display screen reaches 8 seconds. If the PIR is triggered again within the preset duration of 8 seconds, and when the screen-on duration of the display screen when the PIR is triggered again is 2 seconds, the 2 seconds plus the preset delayable duration of 5 seconds is less than 8 seconds (a sum of 2 seconds and 5 seconds is 7 seconds), the display screen may be still turned off when the screen-on duration of the display screen reaches 8 seconds. When the screen-on duration of the display screen when the PIR is triggered again is 6 seconds, the 6 seconds plus the preset delayable duration of 5 seconds is greater than 8 seconds (a sum of 6 seconds and 5 seconds is 11 seconds), the upper limit of the screen-on duration of the display screen may be adjusted to 11 seconds.

If the PIR is not triggered again within 11 seconds, the display screen may be turned off when the screen-on duration of the display screen reaches 11 seconds. If the PIR is triggered again within 11 seconds, furthermore, when the screen-on duration of the display screen when the PIR is triggered again is 8 seconds, the upper limit of the screen-on duration of the display screen may be dynamically updated, and the upper limit of the screen-on duration of the display screen may be updated to 13 (i.e., 8+5=13) seconds. As the PIR is repeatedly triggered when the display screen is in the screen-on state, the upper limit of the screen-on duration of the display screen may be constantly delayed until it reaches 30 minutes, and reaches the longest screen-on duration. In such cases, even if the PIR is still triggered, the display screen may be still turned off when the screen-on duration of the display screen reaches 30 minutes to avoid waste of power consumption.

In the method for screen controlling of a monitoring device disclosed in the embodiment, the preset delayable duration and the preset longest screen-on duration may be introduced to ensure that the display screen is always in the screen-on state when there is a person outside the door and there is a person inside the door until the screen-on duration of the display screen reaches the upper limit, for example, the preset longest screen-on duration. The screen-on duration may be adjusted automatically according to the activities of the person outside the door, which may improve the overall endurance of the monitoring device.

In the method for screen controlling of a monitoring device disclosed in the embodiment, an alarm button may be provided on the monitoring device. The user may observe the situation outside the door through the display screen, and trigger the alarm button when the user determines an abnormal condition. When detecting that the alarm button is triggered, the monitoring device may send an alarm request to the server so that the server may send alarm information to a preset user terminal. A count of the preset user terminals may be one or more terminals, and the method for the server to send the alarm information to the user terminal may be a SMS, a phone call, an APP push, or the like.

The monitoring device may also send real-time videos collected by the camera to the server, so that the server may determine whether there is an abnormal condition according to the real-time videos collected by the camera. If there is an abnormal condition, alarm information may be sent to the preset user terminal, which may avoid a risk of an abnormal condition outside the door and there is no person inside the house, so that users can get alarm information at the first time.

When the preset user terminal receives the alarm information sent by the monitoring device through the server, information obtaining requests may be sent to the monitoring device through the server, and the monitoring device may send the real-time videos collected by the camera to the preset user terminal through the server. Specifically, the user may add a video time interval to the information obtaining request according to the requirements, that is, the video of which time interval may be requested. A user of the preset user terminal can remotely check and confirm the condition outside the door in order to take corresponding measures, which may reduce possible damages or loss under an abnormal condition, and effectively ensure the safety of the family.

When the preset user terminal receives the alarm information sent by the monitoring device through the server, a video call request may be sent to the monitoring device through the server, and the monitoring device may establish a video call with a preset user terminal through the server, which may realize a remote video call between the user of the preset user terminal and the user inside the house to confirm the specific situation.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. In addition, some features, structures, or features in the present disclosure of one or more embodiments may be appropriately combined.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, all aspects of the present disclosure may be performed entirely by hardware, may be performed entirely by softwares (including firmware, resident softwares, microcode, etc.), or may be performed by a combination of hardware and softwares. The above hardware or software can be referred to as "data block," "module," "engine," "unit," "component" or "system". In addition, aspects of the present disclosure may appear as a computer product located in one or more computer-readable media, the product including computer-readable program code.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

At last, it should be understood that the embodiments described in the present disclosure are merely illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A security control system, comprising:
   at least one storage device storing a set of instructions; and
   one or more processors in communication with the at least one storage device, wherein when executing the set of instructions, the one or more processors are configured to direct the system to:
   obtain first data from a first device, the first device including a monitoring data obtaining device;
   obtain second data from a second device, the second device including an access switch device or a smart lock, the second data including at least one of operation instructions of the second device, identity information of an operator of the second device, or a password of the second device;
   associate and process the first data and the second data by establishing an association relationship between the first data and the corresponding second data based on an association identifier carried by the first data and/or the second data, wherein the association relationship includes:
      the first data and the second data have a same association identifier,
      one party of the first data and the second data carries the association identifier of the other party of the first data and the second data, or
      both the first data and the second data is retrievable based on the same association identifier;
   encapsulate the processed first data and second data in a data packet; and
   store the data packet in a storage device,
   wherein the association identifier includes at least one of:
      an ID of the first device or the second device,
      a factory number of the first device or the second device,
      an event tag of the first device or the second device, or
      a customized association tag of the first device or the second device.

2. The system of claim 1, wherein the one or more processors are further configured to direct the system to:
   send the processed first data and second data to a server and/or a user terminal.

3. The system of claim 1, wherein the second data further includes execution results of operation instructions.

4. The system of claim 1, wherein to associate and process the first data and/or the second data, the one or more processors are further configured to direct the system to:
   in response to a determination that the second device detects the second data, control the first device to collect the first data and integrate the association identifier related to the second data into the first data; or
   in response to a determination that the first device detects the first data, obtain the association identifier related to the first data, and in response to a determination that the second device detects the second data within a preset time, integrate the association identifier related to the first data into the second data.

5. The system of claim 1, wherein to associate and process the first data and/or the second data, the one or more processors are further configured to direct the system to:
   integrate an obtaining time of the first data and an obtaining time of the second data into the first data and the second data, respectively.

6. The system of claim 1, wherein to associate and process the first data and/or the second data, the one or more processors are further configured to direct the system to:
   determine, based on the obtaining time carried by the second data, whether the obtaining time carried by the first data from a same security device includes the obtaining time carried by the second data; and
   in response to a determination that the obtaining time carried by the first data includes the obtaining time carried by the second data, establish an association relationship between the first data and the corresponding second data.

7. The system of claim 1, wherein to associate and process the first data and/or the second data, the one or more processors are further configured to direct the system to:
   recognize an operator image from the first data using an image recognition algorithm;
   obtain identity information in the second data associated with the first data; and
   obtain the operator image marked with the identity information by establishing an association relationship between the identity information and the operator image in the first data.

8. The system of claim 7, wherein the one or more processors are further configured direct the system to:
   receive the first data obtained by the first device;
   recognize a current operator image from the first data using the image recognition algorithm; and
   determine an identity of a current operator based on the current operator image and the operator image marked with the identity information.

9. The system of claim 8, wherein the one or more processors are further configured to direct the system to:

take corresponding measures based on the identity of the current operator;
wherein the measures include at least one of: sending at least a portion of the first data and/or at least a portion of the second data to a user terminal associated with the first device for confirmation, switching a state of the second device, or generating alarm information.

10. The system of claim 1, wherein the one or more processors are further configured to direct the system to:
obtain a first sensing signal through one or more first sensing units, the first sensing signal being configured to indicate whether there is any person within a preset range of the first device;
control the first device to obtain the first data based on the first sensing signal;
obtain a second sensing signal through one or more second sensing units, the second sensing signal being configured to indicate whether there is any person within a preset range of a display unit; and
control the display unit to be turned on or off based on the first sensing signal and the second sensing signal, wherein the first data is displayed when the display unit is turned on.

11. The system of claim 10, wherein to control the display unit to be turned on or off based on the first sensing signal and the second sensing signal, the one or more processors are further configured to direct the system to:
in response to a determination that the first sensing signal indicates that there is a person within the preset range of the first device, and the second sensing signal indicates that there is a person within the preset range of the display unit, turn on the display unit.

12. The system of claim 11, wherein to control the display unit to be turned on or off based on the first sensing signal and the second sensing signal, the one or more processors are further configured to direct the system to:
time a screen-on duration of the display unit when the display unit is turned on; and
turn off the display unit when the display unit is in a screen-on state and the screen-on duration reaches a duration threshold.

13. The system of claim 12, wherein the duration threshold has an initial value, and the duration threshold is dynamically set.

14. The system of claim 13, wherein to set the duration threshold, the one or more processors are further configured to direct the system to:
obtain the first sensing signal again when the display unit is in a screen-on state;
in response to a determination that the first sensing signal indicates there is a person within the preset range of the first device, add a delay increment to a timing result of the screen-on duration of the display unit, and in response to a determination that the timing result plus the delay increment is greater than the initial value of the duration threshold, determine the timing result plus the delay increment as an updated duration threshold.

15. The system of claim 1, wherein the one or more processors are further configured to direct the system to:
in response to a determination that an alarm button is triggered, send alarm information to an associated user terminal; or
in response to a determination on a basis of the first data that there is an abnormal condition, send alarm information to the associated user terminal.

16. The system of claim 15, wherein the one or more processors are further configured to direct the system to:

receive a data request sent by the associated user terminal; and
provide the first data and/or the second data to the associated user terminal.

17. The system of claim 1, wherein the first data and the second data are associated with a same user identifier, and the second data carries an identity attribute of an unlocker, the one or more processors are further configured to direct the system to:
determine first data and second data associated with a same unlocking operation;
recognize a face image included in the first data using a face recognition algorithm; and
obtain a marked face image by establishing an association relationship between the identity attribute carried by the second data and the face image included in the first data associated with the same unlocking operation.

18. The system of claim 1, wherein the second data carries an identity attribute of an unlocker, and the first data is generated after the first device receives a video trigger instruction that is sent by the associated second device and carries the identity attribute of the unlocker, the one or more processors are further configured to direct the system to:
recognize a face image included in the first data; and
obtain a marked face image by establishing an association relationship between the identity attribute of the unlocker and the face image.

19. A security control method implemented on at least one machine each of which has at least one processor and at least one storage device, the method comprising:
obtaining first data from a first device, the first device including a monitoring data obtaining device;
obtaining second data from a second device, the second device including an access switch device or a smart lock, the second data including at least one of operation instructions of the second device, identity information of an operator of the second device, or a password of the second device;
associating and processing the first data and the second data by establishing an association relationship between the first data and the corresponding second data based on an association identifier carried by the first data and/or the second data, wherein the association relationship includes:
the first data and the second data have a same association identifier,
one party of the first data and the second data carries the association identifier of the other party of the first data and the second data, or
both the first data and the second data is retrievable based on the same association identifier;
encapsulate the processed first data and second data in a data packet; and
store the data packet in a storage device,
wherein the association identifier includes at least one of:
an ID of the first device or the second device,
a factory number of the first device or the second device,
an event tag of the first device or the second device, or
a customized association tag of the first device or the second device.

20. A data association method implemented on at least one machine each of which has at least one processor and at least one storage device, the method comprising:
obtaining door lock data uploaded by a smart door lock and peephole viewer data uploaded by a smart peephole viewer, the door lock data and the peephole viewer data being associated with a same user identifier, the door lock data including at least one of operation instructions of the smart door lock, identity information of an operator of the smart door lock, or a password of the smart door lock;

determining, from the door lock data and the peephole viewer data, a set of door lock data and a set of peephole viewer data associated with a same unlocking operation;

associating the set of door lock data and the set of peephole viewer data associated with the same unlocking operation to obtain associated data by establishing an association relationship between the set of door lock data and the set of peephole viewer data associated with the same unlocking operation based on an association identifier carried by the set of door lock data and/or the set of peephole viewer data associated with the same unlocking operation, wherein the association relationship includes:

the set of door lock data and the set of peephole viewer data associated with the same unlocking operation have a same association identifier, one party of the set of door lock data and the set of peephole viewer data associated with the same unlocking operation carries the association identifier of the other party of the set of door lock data and the set of peephole viewer data associated with the same unlocking operation, or both the set of door lock data and the set of peephole viewer data associated with the same unlocking operation is retrievable based on the same association identifier;

encapsulating the associated data in a data packet; and storing the data packet in a storage device, wherein the association identifier includes at least one of:
- an ID of the smart peephole viewer or the smart door lock,
- a factory number of the smart peephole viewer or the smart door lock,
- an event tag of the smart peephole viewer or the smart door lock, or
- a customized association tag of the smart peephole viewer or the smart door lock.

* * * * *